United States Patent
Shirakawa

(10) Patent No.: US 7,107,760 B2
(45) Date of Patent: Sep. 19, 2006

(54) EXHAUST GAS PURIFYING SYSTEM FOR INTERNAL COMBUSTION ENGINE

(75) Inventor: Takashi Shirakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 118 days.

(21) Appl. No.: 10/823,721

(22) Filed: Apr. 14, 2004

(65) Prior Publication Data

US 2004/0206070 A1 Oct. 21, 2004

(30) Foreign Application Priority Data

Apr. 18, 2003 (JP) .............................. 2003-114717

(51) Int. Cl.
*F01N 3/00* (2006.01)

(52) U.S. Cl. .............................. 60/285; 60/286; 60/295; 60/297

(58) Field of Classification Search .................. 60/278, 60/285, 286, 295, 297
See application file for complete search history.

(56) References Cited

U.S. PATENT DOCUMENTS

| | | | | |
|---|---|---|---|---|
| 6,568,177 B1* | 5/2003 | Surnilla | ........................ | 60/285 |
| 6,796,118 B1* | 9/2004 | Kitahara | ........................ | 60/285 |
| 2004/0016227 A1* | 1/2004 | Kitahara | ........................ | 60/285 |

FOREIGN PATENT DOCUMENTS

| | | | |
|---|---|---|---|
| JP | 2000-179326 A | 6/2000 | |
| JP | 2002-155793 A | 5/2002 | |

\* cited by examiner

*Primary Examiner*—Thomas Denion
*Assistant Examiner*—Loren Edwards
(74) *Attorney, Agent, or Firm*—Foley & Lardner LLP

(57) ABSTRACT

An exhaust gas purifying system for an internal combustion engine is arranged to determine a recovery execution timing for recovery processing of recovering an exhaust gas purifying device such as a particulate filter and a NOx trap catalyst from a specific content stacked state, to determine a target air/fuel ratio for executing the recovery processing, to determine a first engine controlled variable relating to an air/fuel ratio on the basis of the target air/fuel ratio, and to determine a second engine controlled variable relating to a combustion period at a value different from a value employed during normal processing when the recovery processing is executed.

14 Claims, 38 Drawing Sheets

FIG.21
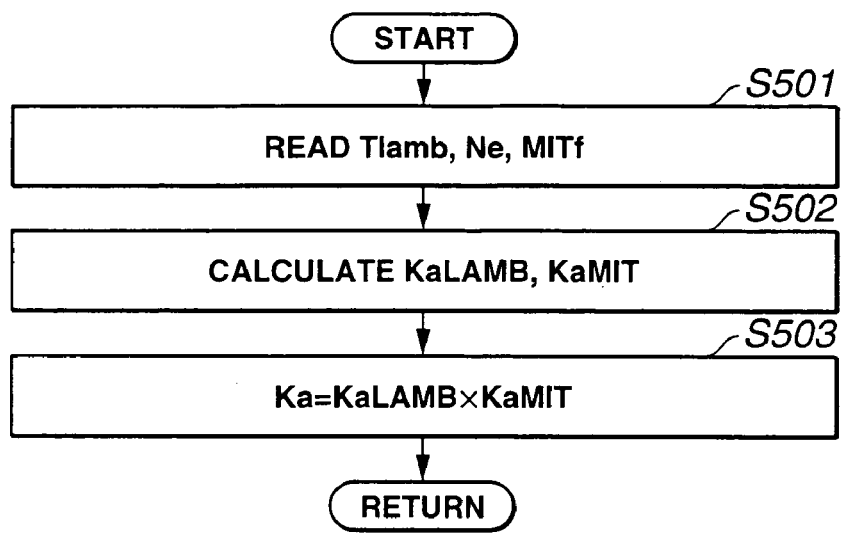
FIG.22A
FIG.22B
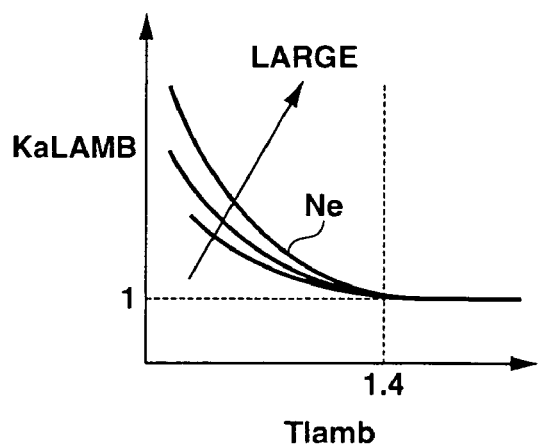
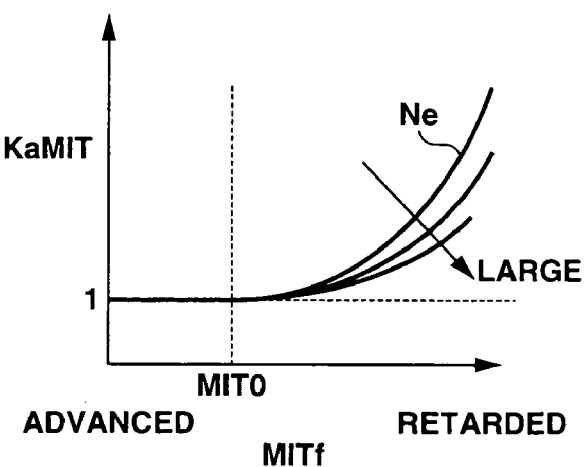

MINOR MALFUNCTION

EXHAUST GAS PURIFYING SYSTEM FOR INTERNAL COMBUSTION ENGINE

BACKGROUND OF THE INVENTION

The present invention relates to an exhaust gas purifying system of an internal combustion engine, and more particularly to a technique for preventing a particulate filter and a NOx trap catalyst from receiving excessive heat load during the recovery processing of these filter and catalyst.

Particulate filters and NOx trap catalysts are common known as traps for removing specific contents from exhaust gas of an internal combustion engine. Each particulate filter has built in a filter element produced by molding ceramic into a honeycomb monolith. The filter element filters out particulates from exhaust gas. Each NOx trap catalyst changes its property according to the air/fuel ratio such as to remove NOx in exhaust gas by trapping NOx in the catalyst when the air/fuel ratio is lean. Such a NOx trap catalyst also traps sulfur content in exhaust gas in addition to NOx. These particulate filter and NOx trap catalyst are required to execute a recovery processing for recovering their performances when the accumulated quantity of eliminated objects such as particulates reaches a predetermine. If the engine is operated without executing the recovery processing of these filter and catalyst, there will cause an undesired increase of an engine back pressure and an undesired discharge of exhaust gas including NOx into atmosphere. Further, the NOx trap catalyst is required to execute recovery processing (desulfurization recovery processing) for desulfurizing sulfur content trapped by NOx trap catalyst in addition to NOx.

Japanese Published Patent Application No. 2002-155793 discloses typical recovery processing of a particulate filter and a NOx trap catalyst wherein particulates trapped by the particulate filter are burnt by raising an exhaust gas temperature at a higher temperature than that during a normal operation, and NOx and sulfur content trapped by the NOx trap catalyst are discharged by temporally changing the air/fuel ratio.

Japanese Published Patent Application No. 2000-179326 discloses a method of increasing an exhaust gas temperature by retarding a main injection timing, by executing a post injection, and by increasing a quantity of exhaust gas recirculation, for the recovery processing of a particulate filter and a NOx trap catalyst.

SUMMARY OF THE INVENTION

However, during the recovery processing of the particulate filter, the air/fuel ratio has been determined as a result of executing a post injection for reaching the exhaust gas temperature to a target temperature, and during the desulfurization recovery processing of the NOx trap catalyst, the air/fuel ratio has been determined as a result of supplying a reduction agent after raising the exhaust gas temperature. That is, no prior art has disclosed a technique of positively controlling an air/fuel ratio in the recovery processing.

It is therefore an object of the present invention to provide an improved exhaust gas purifying system which is capable of recovering a particulate filter and a NOx trap catalyst without applying an excessive heat load to these filter and catalyst.

An aspect of the present invention resides in an exhaust gas purifying system for an internal combustion engine which comprises an exhaust gas purifying device which is disposed in an exhaust passage of the engine to remove specific content from exhaust gas and a control unit which is arranged to determine a recovery execution timing for executing recovery processing of recovering the exhaust gas purifying device from a specific content stacked state, to determine a target air/fuel ratio for executing the recovery processing, to determine a first engine controlled variable relating to an air/fuel ratio on the basis of the target air/fuel ratio, and to determine a second engine controlled variable relating to a combustion period at a value different from a value employed during normal processing when the recovery processing is executed.

Another aspect of the present invention resides in an exhaust gas purifying system for an internal combustion engine, which comprises an exhaust gas purifying device disposed in an exhaust passage of the engine to remove specific content from exhaust gas and a control unit which is arranged to determine whether recovery processing for recovering the exhaust gas purifying device as to accumulated specific contents in the exhaust gas purifying device is executed, and to increase an exhaust gas temperature at a temperature higher than an exhaust gas temperature during normal processing, by setting an air/fuel ratio at a target air/fuel ratio and by controlling the a combustion period while maintaining the air/fuel ratio at the target air/fuel ratio when the recovery processing is executed.

A further aspect of the present resides in a method of executing recovery processing of an exhaust gas purifying disposed in an exhaust passage of an internal combustion engine. The method comprises an operation of determining a recovery execution timing for recovery processing of recovering the exhaust gas purifying device from a specific content stacked state, an operation of setting a target air/fuel ratio for executing the recovery processing, an operation of setting a first engine controlled variable relating to an air/fuel ratio on the basis of the target air/fuel ratio, and an operation of setting a second engine controlled variable relating to a combustion period at a value different from a value employed during normal processing when the recovery processing is executed.

The other objects and features of this invention will become understood from the following description with reference to the accompanying drawings.

BRIEF DESCRIPTION OF THE DRAWINGS

FIG. 21 is a flowchart of a torque correction coefficient calculation routine.

FIGS. 22A and 22B are maps for obtaining torque correction coefficients.

DETAILED DESCRIPTION OF THE INVENTION

Figure 1:
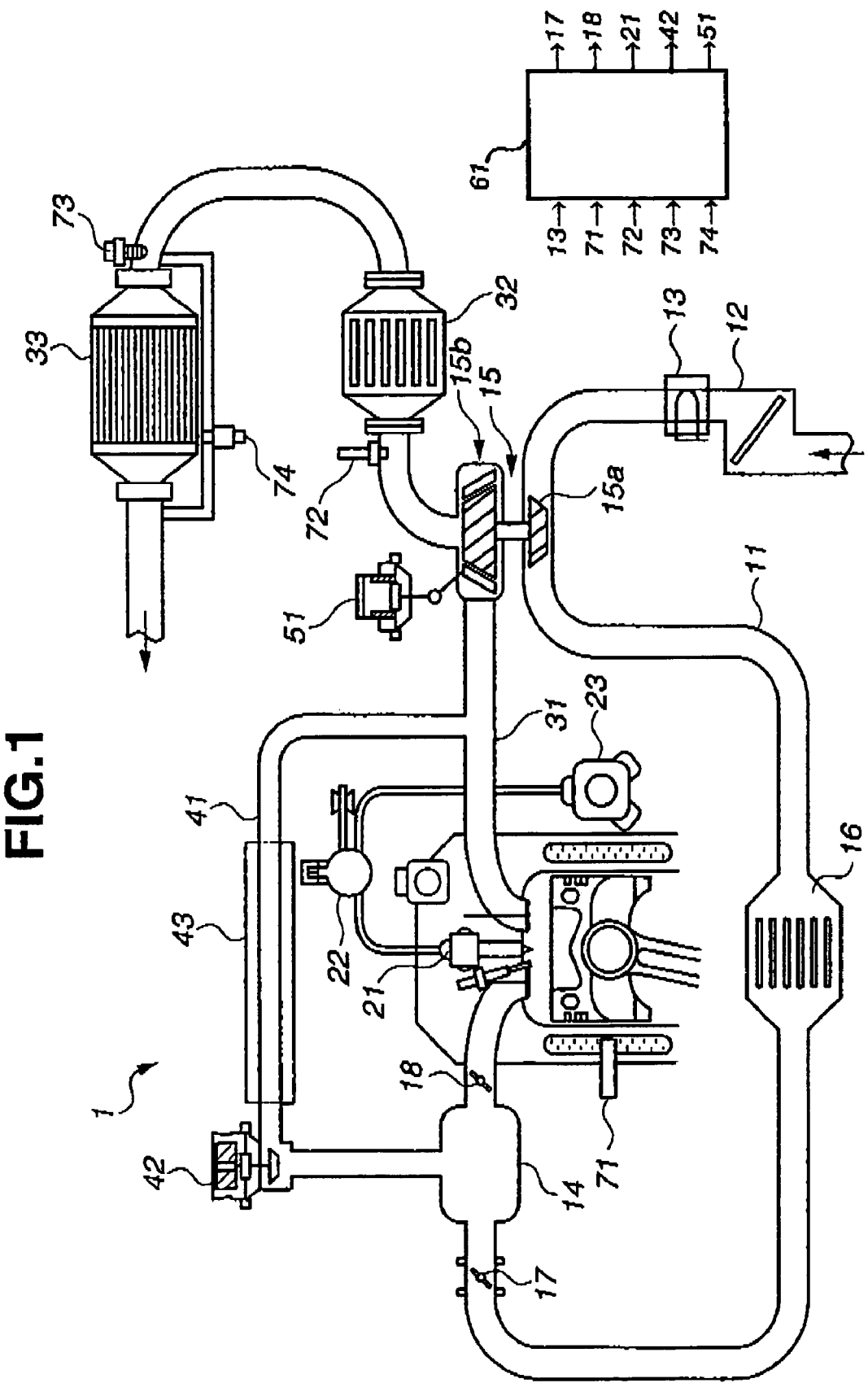
FIG. 1 is a view showing a direct injection type diesel engine provided with an embodiment of an exhaust gas purifying system according to the present invention.

Referring to the drawings, there is discussed an embodiment of an exhaust gas purifying system according to the present invention. FIG. 1 shows a direct injection diesel engine 1 which employs the exhaust gas purifying system according to the present invention.

An air cleaner 12 for removing dust particles from intake fresh air is attached to an inlet of an intake passage 11. An airflow meter 13 is disposed downstream of air cleaner 12 and measures an airflow rate. The air passed through air cleaner 12 and airflow meter 13 is flowed into a collector 14 and is distributed into cylinders through an intake manifold.

A nozzle-variable type turbocharger 15 is attached to engine 1, and more specifically a compressor section 15a of turbocharger 15 is disposed upstream of collector 14. An intercooler 16 is disposed between compressor section 15a and collector 14 to cool the intake air compressed by turbocharger 15. An intake throttle valve 17, through which intake air flow rate is controlled, is provided upstream of collector 14. A swirl control valve 18 for controlling gas flow in each cylinder is provided at each intake port for each cylinder. An electronic control unit (ECU) 61 outputs control signals to intake throttle valve 17 and swirl control valve 18, respectively.

Fuel injectors 21 for the respective cylinders are fixed to a cylinder head of an engine body so that an injecting portion of each fuel injector 21 is faced with a combustion chamber upper portion of each cylinder. A fuel system of engine 1 comprises a common rail 22 so that fuel fed by a fuel pump 23 is controlled at a predetermined pressure and is supplied through common rail 22 to each fuel injector 21. Each fuel injector 21 executes fuel injection in response to the signal from ECU 61. The fuel injection by each fuel injector 21 is constructed by several time injections. Each fuel injector 21 executes a pilot injection at a moment before a main injection is executed in addition to the main injection. This pilot injection suppresses the generation of particulates and reduces the level of combustion noise.

A NOx trap catalyst 32, which traps NOx or reduces and desorbs the trapped NOx according to the air/fuel ratio of exhaust gas, is disposed downstream of an exhaust manifold of engine 1. A diesel particulate filter 33 functioning as a particulate filter is disposed downstream of NOx trap catalyst 32. Under a normal lean operating condition, NOx and particulates in exhaust gas are removed from the exhaust gas by NOx trap catalyst 32 and diesel particulate filter 33. Under the normal lean operating condition, NOx trap catalyst 32 traps sulfur in the exhaust gas in addition to NOx.

An EGR conduit 41 connects exhaust passage 31 and intake passage 11. An EGR valve 42 is disposed in EGR conduit 41. By controlling an opening of EGR valve 42 according to the control signal of ECU 61, a proper quantity of exhaust gas according to the opening degree of EGR valve 42 is recirculated (returned) to intake passage 11. An EGR gas cooler 43 is disposed upstream of EGR valve 42 to cool EGR gas.

A turbine 15b of turbocharger 15 is disposed between a portion connected to EGR conduit 42 and NOx trap catalyst 32 in exhaust passage 31. A nozzle opening of turbine 15b is controlled by an actuator 51 which moves a variable vane of turbine 15b according to a signal outputted from ECU 61.

The exhaust gas purifying system comprises NOx trap catalyst 32, diesel particulate filter 33, ECU 61 having a recovery function of catalyst 32 and filter 33, and sensors. These sensors includes airflow meter 13, a sensor 71 for detecting a temperature Tw of engine coolant, a sensor 72 for detecting an excess air ratio lamb of exhaust gas upstream of NOx trap catalyst 32, a sensor 73 for detecting an exhaust gas temperature Texh of exhaust gas upstream of diesel particulate filter 33, and a sensor 74 for detecting a pressure difference ΔPdpf between pressures at upstream side and downstream side of diesel particulate filter 33.

Figure 2:
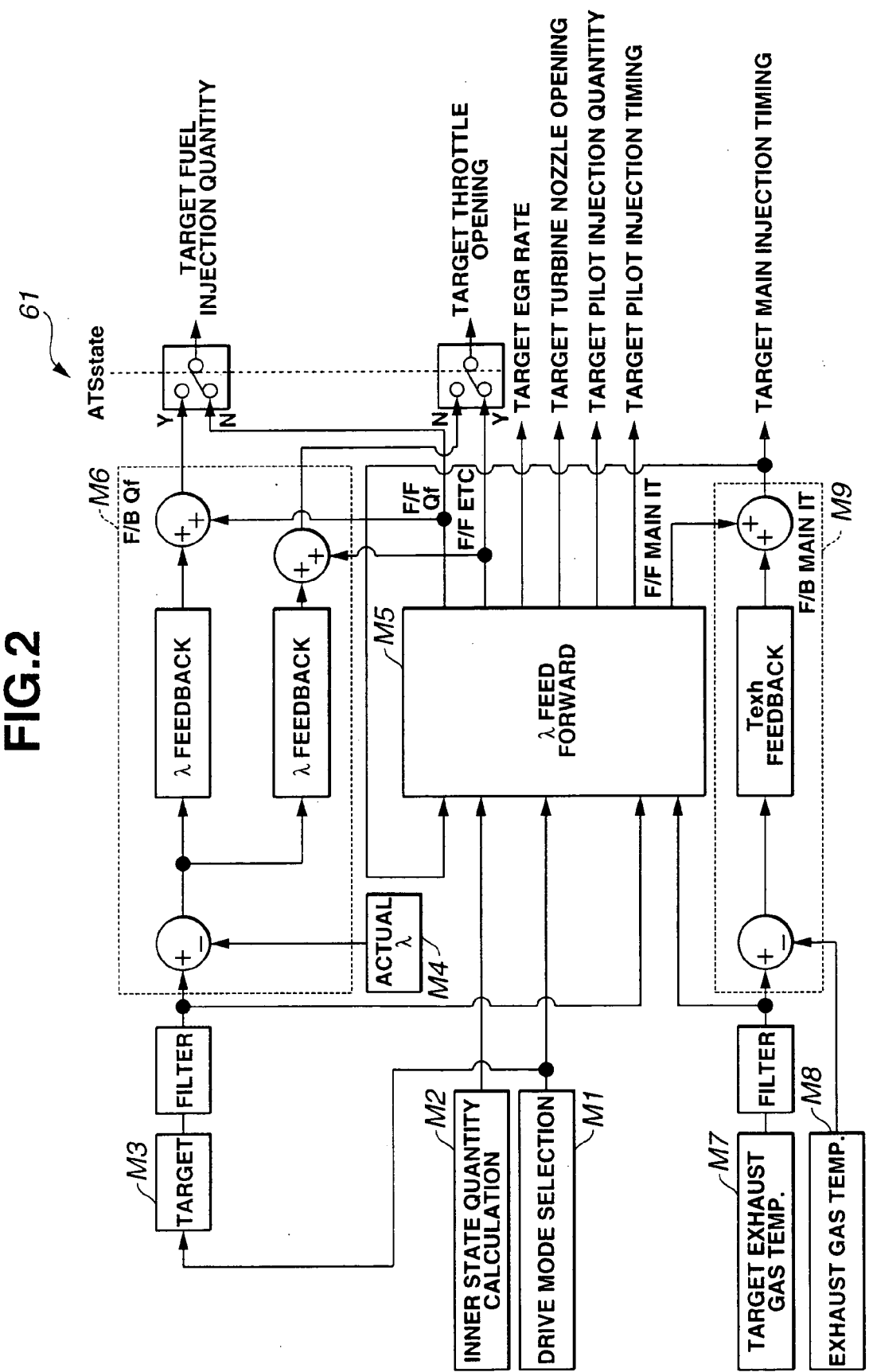
FIG. 2 is a block diagram showing an electronic control unit of the embodiment according to the present invention.

FIG. 2 is a block diagram showing functions of ECU 61. In FIG. 2, a module M1 performs a function of setting a mode decision value ATSstate to changeover an operation mode between a normal mode and a recovery mode. The recovery mode includes a desulfurization recovery mode and a filter recovery mode. A module M2 performs a function of calculating an inner state quantity of engine 1, such as a cylinder intake air quantity Qac, and an EGR rate Regr. A module M3 performs a function of calculating a target excess air ratio tlamb according to mode decision value ATSstate. A module M4 performs a function of calculating an actual excess are ratio lamb. A module M5 performs a function of calculating a target EGR rate, a target turbine opening, a target intake throttle opening and a target fuel injection quantity to achieve target excess air ratio tlamb. A module M6 performs functions of calculating a difference between target excess air ratio tlamb and actual excess air ratio lamb and of calculating a feedback correction quantity for one of fuel injection quantity and intake throttle valve opening on the basis of the obtained difference so as to bring actual excess air ratio lamb closer to target excess air ratio tlamb. A module M7 performs a function of correcting a main injection timing so as to achieve a target exhaust gas temperature tTexh according to mode decision value ATSstate when the recovery mode is selected. Further, module M7 performs a function of correcting a pilot injection timing to suppress the generation of smoke and to reduce the generation of combustion noise. The main injection timing and the pilot injection timing correspond to a second engine controlled variable. The pilot injection quantity may be employed as second engine controlled variable. A module M8 performs a function of calculating exhaust gas temperature Texh on the basis of the signal outputted from sensor 73. A module M9 performs a function of correcting the main injection timing so as to decrease a difference between target exhaust gas temperature tTexh and exhaust gas temperature Texh.

Hereinafter, there are discussed operations of ECU 61 corresponding to modules M1 through M9.

Figure 3:
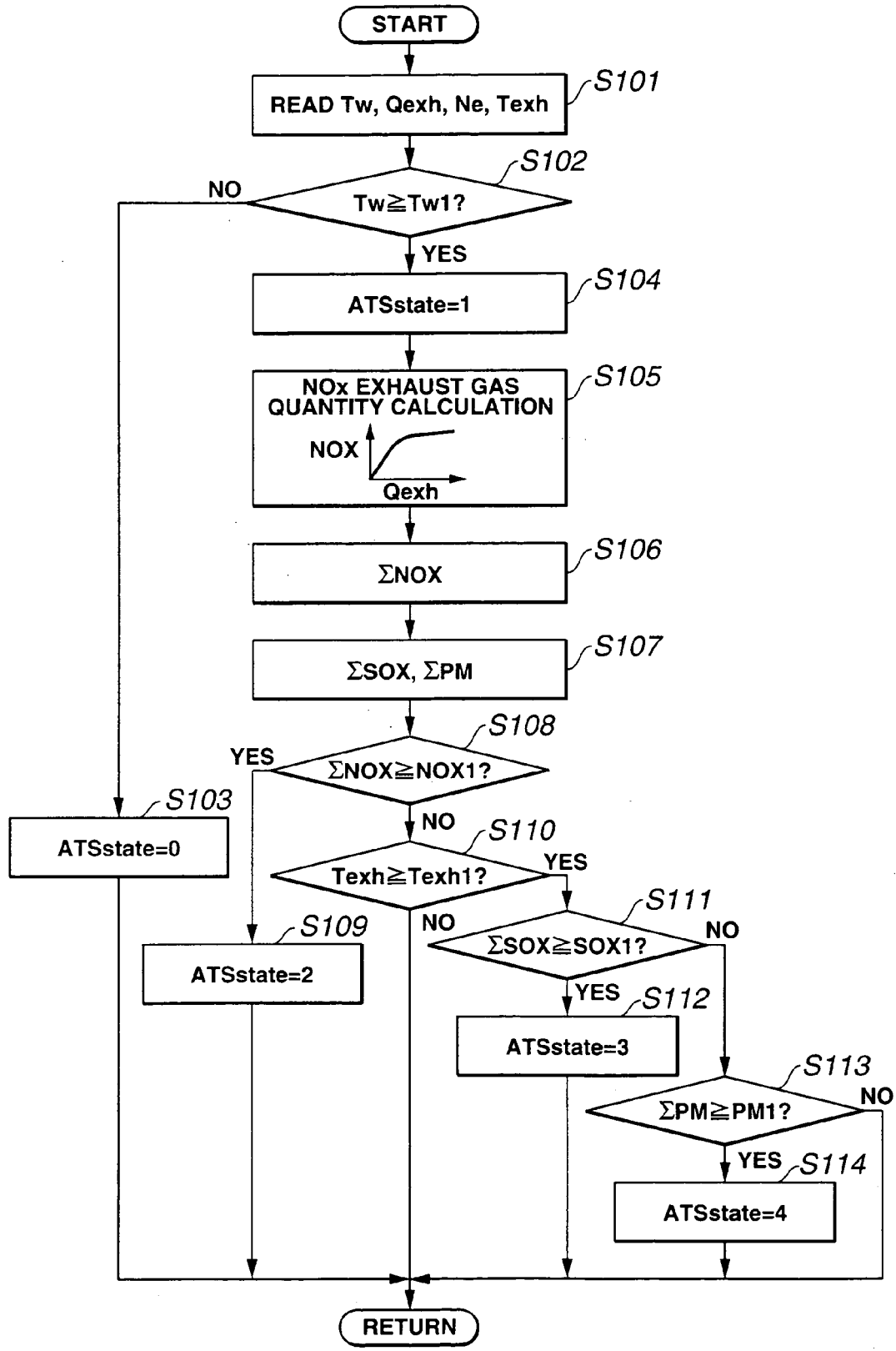
FIG. 3 is a flowchart of a mode decision value setting routine.

First there is discussed a manner of setting of mode decision value ATSstate. FIG. 3 is a flowchart of a mode decision value setting routine and is started at module M1 of ECU 61.

At step S101 ECU 61 reads coolant temperature Tw, exhaust gas flow rate Qexh, an engine speed Ne, exhaust gas temperature Texh. At step S102 ECU 61 determines whether or not coolant temperature Tw is higher than or equal to a predetermined temperature Tw1. When the determination at step S102 is negative, that is, coolant temperature Tw is lower than predetermined temperature Tw1, the routine proceeds to step S103 wherein ECU 61 sets mode decision value ATSstate at 0 (ATSstate=0). Thereafter, the routine returns to a start block. When the determination at step S102 is affirmative, that is, coolant temperature Tw is higher than or equal to predetermined temperature Tw1, the routine proceeds to step S104 wherein ECU 61 sets mode decision value ATSstate at 1 (ATSstate=1).

At step S105 subsequent to the execution of step S103, ECU 61 calculates a NOx exhaust quantity NOX per unit time in exhaust gas, on the basis of exhaust gas flow rate Qexh. At step S106 ECU 61 obtains an integral of NOx exhaust quantity NOX and stores the obtained integral as a NOx trap quantity ΣNOX, which is stored in NOx trap catalyst 32, in a memory of ECU 61. At step S107 ECU 61 calculates an integrating value of engine speed Ne and stores the obtained value as a sulfur trap quantity ΣSOX, which is stored in NOx trap catalyst 32, in the memory of ECU 61. Further, at step S107 ECU 61 stores the obtained value as a particulate accumulated quantity ΣPM, which is stored in diesel particulate filter 33, in the memory of ECU 61.

At step S108 ECU 61 determines whether or not NOx trap quantity ΣNOX is greater than or equal to a predetermined quantity ΣNOX1. When the determination at step S108 is affirmative (ΣNOX≧ΣNOX1), the program proceeds to step S109 wherein ECU 61 sets mode decision value ATSstate at 2 (ATSstate=2). When the determination at step S108 is negative (ΣNOX<ΣNOX1), the program proceeds to step S110.

At step S110 ECU 61 determines whether or not exhaust gas temperature Texh is higher than or equal to a predetermined temperature Texh1. When the determination at step S110 is affirmative (Texh≧Texh1), the program proceeds to step S111. When the determination at step S110 is negative (Texh<Texh1), the program proceeds to a return block to return the present routine.

At step S111 ECU 61 determines whether or not sulfur trap quantity ΣSOX is greater than or equal to a predetermined quantity ΣSOX1. When the determination at step S111 is affirmative (ΣSOX≧SOX1), the program proceeds to step S112 wherein ECU 61 set mode decision value ATSstate at 3 (ATSstate=3). When the determination at step S111 is negative (ΣSOX<ΣSOX1), the program proceeds to step S113.

At step S113 ECU 61 determines whether or not particulate accumulated quantity ΣPM is greater than or equal to a predetermined quantity ΣPM1. When the determination at step S113 is affirmative (ΣPM≧ΣPM1), the program proceeds to step S114 wherein ECU 61 sets mode decision value ATSstate at 1 (ATSstate=1). Thereafter the present routine is returned. When the determination at step S113 is negative (ΣPM<ΣPM1), the program proceeds to the return block to return the present routine.

When mode decision value ATSstate is set at 3 or 4, ECU 61 selects an exhaust gas temperature rising mode and executes a control for rising the exhaust gas temperature under a condition that the excess air ratio is set at a stoichiometric air/fuel ratio or neighborhood thereof. After the exhaust gas temperature reaches the target temperature, when mode decision value ATSstate is set at 3 (ATSstate=3), ECU 61 selects a desulfurization mode and executes a control for discharging sulfur trapped in NOx trap catalyst 32 by varying the excess air ratio to a rich side. When mode decision value ATSstate is set at 4 (ATSstate=4), ECU 61 selects a filter recovery mode and executes a control for burning particulates accumulated in diesel particulate filter 33 by varying the excess air ratio to a lean side. When exhaust gas temperature Texh reaches a second predetermined temperature Texh2 higher than predetermined temperature Texh1 during the recovery processing, ECU 61 selects a malfunction avoidance mode, lowers exhaust gas temperature Texh by varying the excess air ratio to the lean side, and suspends the recovery processing, in order to prevent the functional deterioration of NOx trap catalyst 32 or burnout of diesel particulate filter 33.

Figure 4:
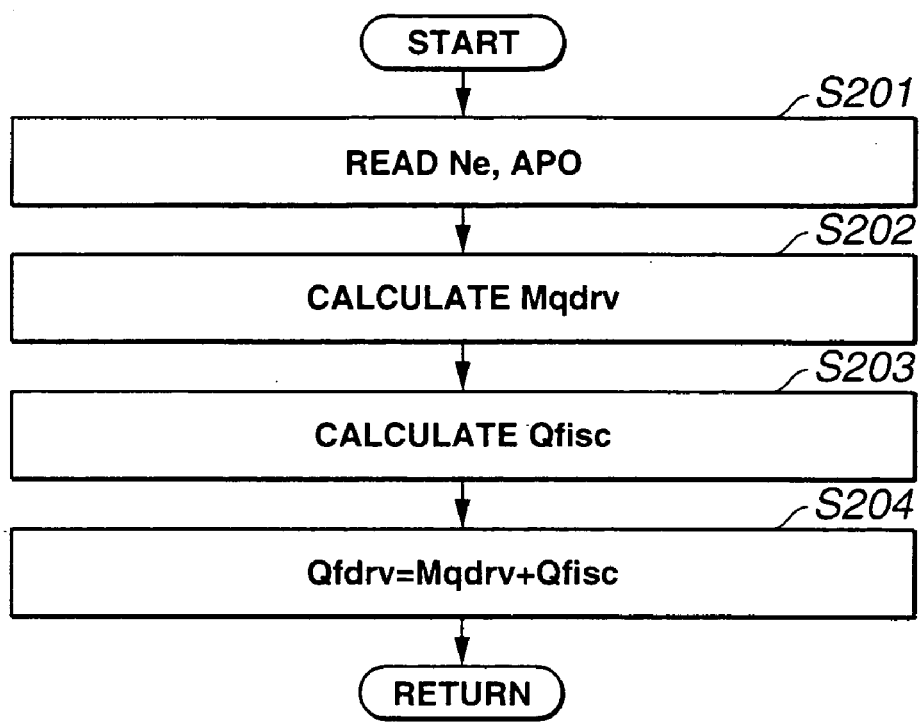
FIG. 4 is a flowchart of a target acceleration request injection quantity calculation routine.

Hereinafter, there is discussed calculations of inner state quantities. FIG. 4 is a flowchart for a calculation routine of a target accelerating demand fuel injection quantity, which is executed by module M2 of ECU 61.

Figure 5:
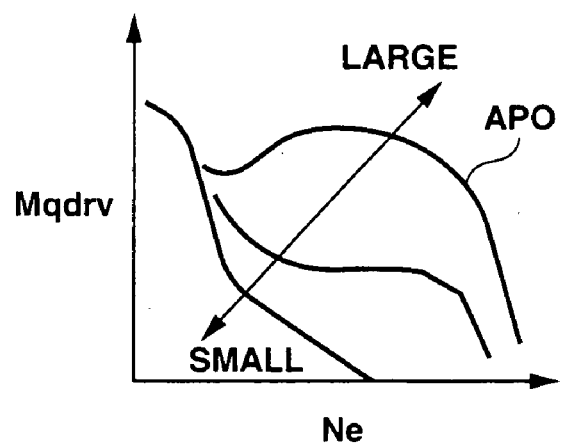
FIG. 5 is a map for obtaining an target acceleration request injection quantity.

At step S201 ECU 61 reads engine speed Ne and control lever opening APO. At step S202 ECU 61 retrieves (calculates) an acceleration demand fuel injection basic value Mqdrv from a map shown in FIG. 5, engine speed Ne and control lever opening APO. At step S203 ECU 61 calculates an idling speed correction quantity Qfisc. At step S204 ECU 61 calculates a target acceleration demand fuel injection quantity Qfdrv by adding the obtained speed correction quantity Qfisc to acceleration demand fuel injection basic value Mqdrv (Qfdrv=Mqdrv+Qfisc).

Figure 6:
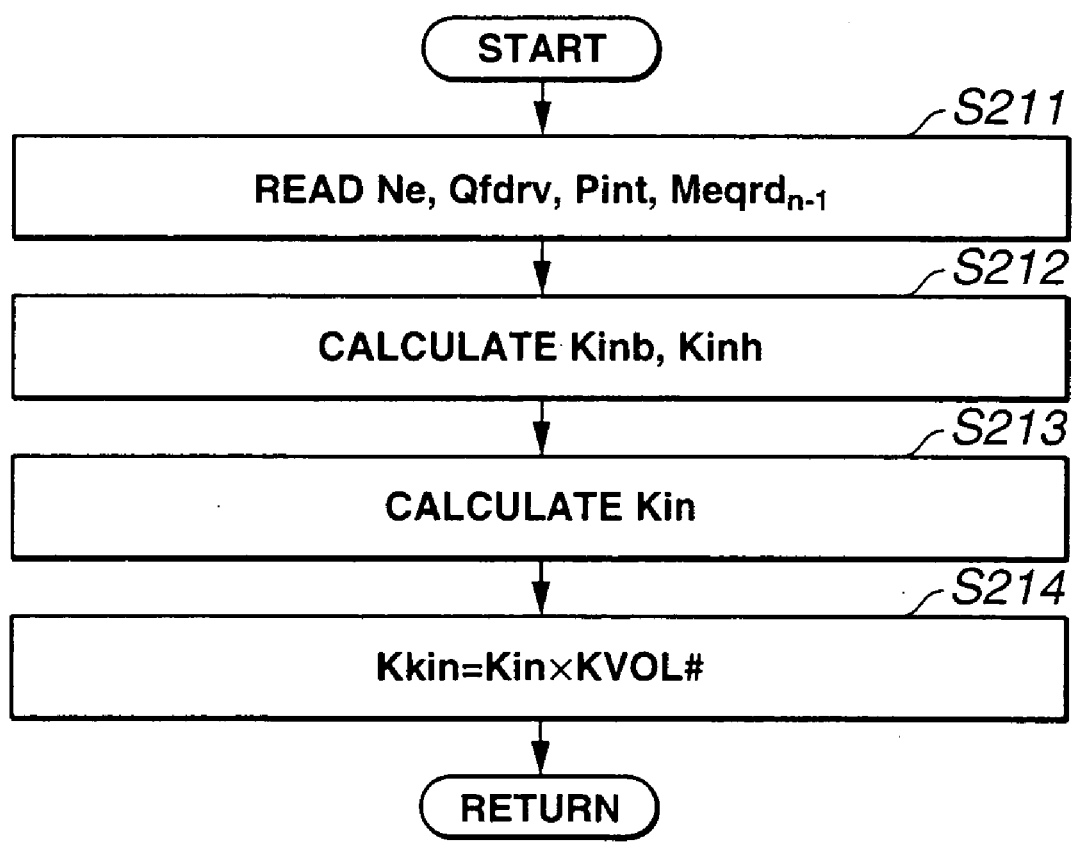
FIG. 6 is a flowchart of an intake system response time constant calculation routine.

FIG. 6 is a flowchart for a calculation routine of an air intake system response time constant, which is executed by module M2 of ECU 61.

At step S211 ECU 61 reads engine speed Ne, target acceleration demand fuel injection quantity Qfdrv, an intake manifold pressure Pint and a target EGR rate $Megrd_{n-1}$. Herein, a first-order delayed value Megrd of target EGR rate Megr is approximated as an actual EGR rate, and reference n-1 denotes that the value with this reference n-1 was obtained in the previous routine.

Figure 7:
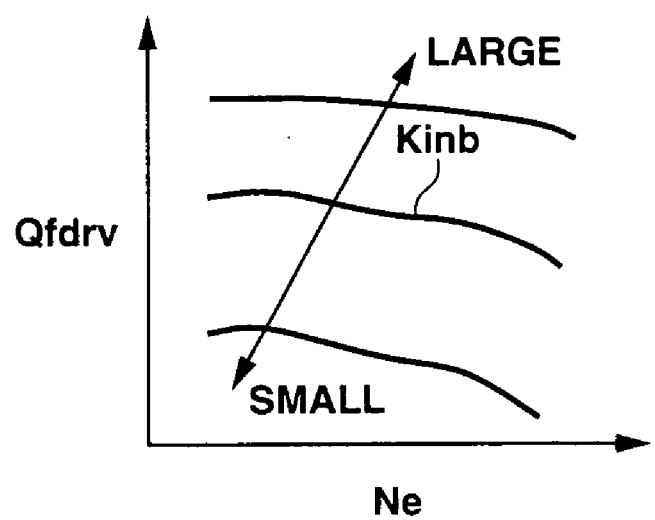
FIG. 7 is a map for obtaining a volumetric efficiency basic value.
Figure 8:
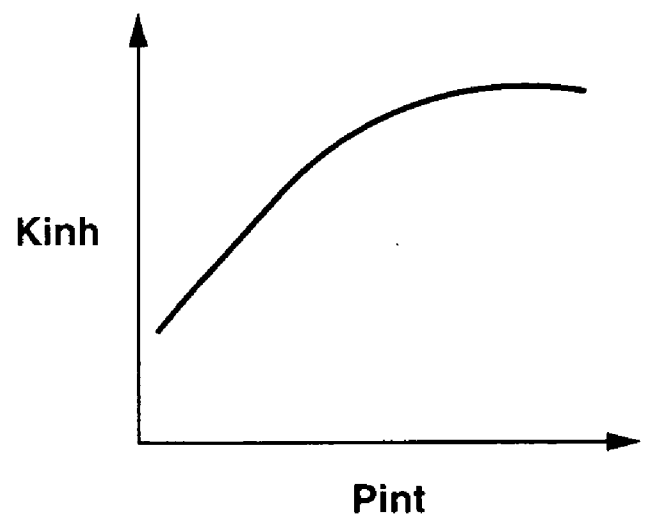
FIG. 8 is a table for obtaining a volumetric efficiency correction value.

At step S212 ECU 61 retrieves (calculates) a volumetric efficiency basic value Kinb from a map shown in FIG. 7 on the basis of engine speed Ne and target acceleration demand fuel injection quantity Qfdrv, and further retrieves (calculates) a volumetric efficiency correction value Kinh from a map shown in FIG. 8 on the basis of intake manifold pressure Pint.

AT step S213 ECU 61 calculates a volumetric coefficient Kin on the basis of volumetric efficiency basic value Kinb, volumetric efficiency correction value Kinh and target EGR rate $Megrd_{n-1}$ from the following expression (1).

$$Kin=Kinb \times Kinh \times (1/(1+Mergd_{n-1})) \qquad (1)$$

At step S214 ECU 61 calculates an air intake system response time constant Kkin by multiplying volumetric coefficient Kin by a volumetric ratio KVOL# (Kkin=Kin×KVOL#). Volumetric ratio KVOL# is a ratio of a stroke volume Vc of pistons Vc and a volume Vm of the intake manifold including the collector 14 (KVOL#=Vc/Vm).

Figure 9:
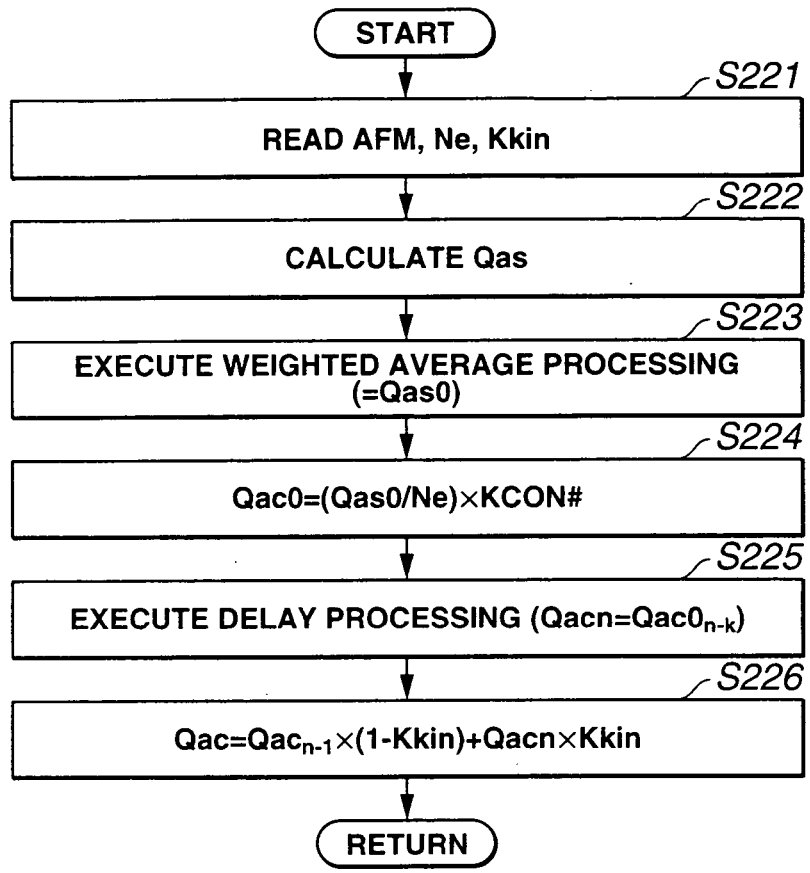
FIG. 9 is a flowchart of a cylinder intake air quantity calculation routine.

FIG. 9 is a flowchart for a calculation routine of an cylinder intake air quantity, which is executed by module M2 of ECU 61.

Figure 10:
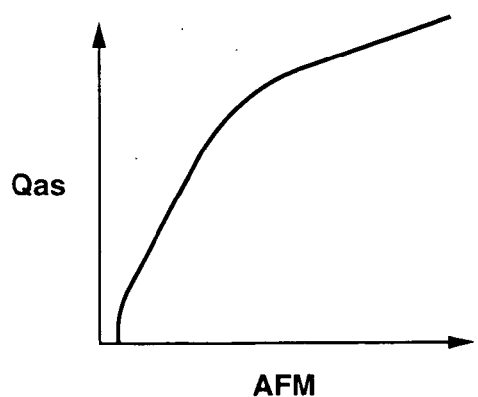
FIG. 10 is a conversion table between a voltage and an intake air quantity.

At step S221 ECU 61 reads output AFM of airflow meter 13, engine speed Ne, air intake system response time constant Kkin. At step S222 ECU 61 obtains an intake air quantity Qas by converting airflow meter output AFM using a table shown in FIG. 10. At step S223 ECU 61 obtains a basic value Qas0 by executing a weighted average process of intake air quantity Qas. At step S224 ECU 61 obtains a per-cylinder per-stroke intake air quantity Qac0 from the following expression (2).

$$Qac0=(Aas0/Ne) \times KCON\# \qquad (2)$$

where KCON# is a unit conversion coefficient.

At step S225 ECU 61 calculates a collector inlet intake air quantity Qacn by executing n-times delay processing of per-cylinder per-stroke intake air quantity Qac0 ($Qacn=Qac0_{n-k}$). At step S226 ECU 61 calculates a cylinder intake fresh air quantity Qac by executing a delay processing of collector inlet intake air quantity Qacn using the following expression (3).

$$Qac=Qac_{n-1} \times (1-Kkin)+Qacn \times Kkin \qquad (3)$$

Figure 11:
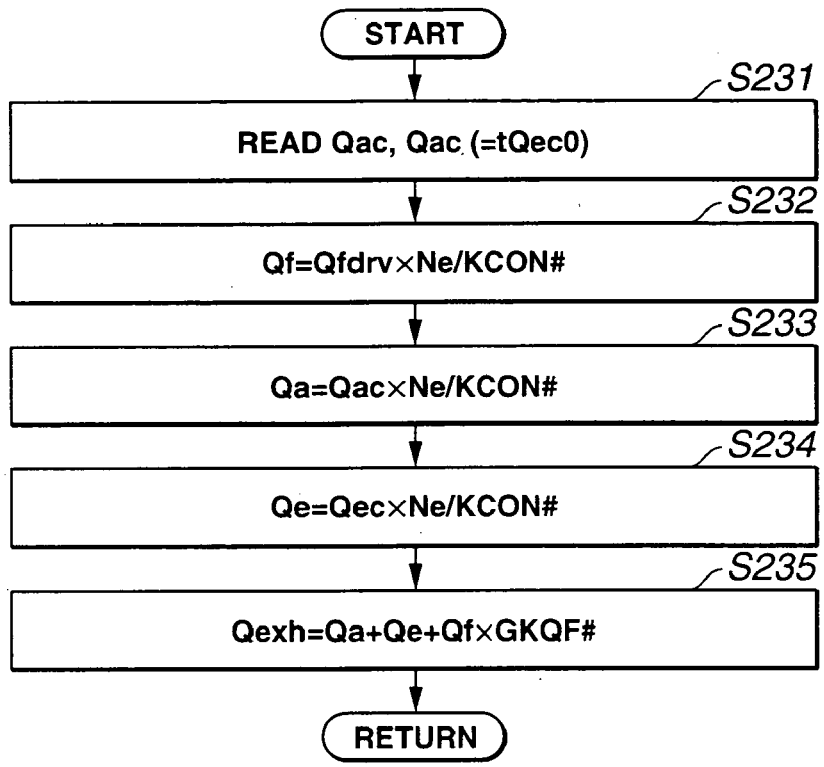
FIG. 11 is a flowchart of an exhaust gas flow rate calculation routine.

FIG. 11 is a flowchart for a calculation routine of an exhaust gas flow rate, which is executed by module M2 of ECU 61.

At step S231 ECU 61 reads cylinder intake air quantity Qac, EGR gas quantity (Qec=tQec0), target accelerating demand fuel injection quantity Qfdrv and engine speed Ne. At step S232 ECU 61 obtains a unit time quantity Qf of target accelerating demand fuel injection quantity Qfdrv using the following expressions (4).

$$Qf=Qfdrv \times Ne/KCON\# \qquad (4)$$

At step S233 ECU 61 obtains a unit time quantity Qa of cylinder intake air quantity Qac using the following expression (5).

$$Qa=Qac \times Ne/KCON\# \qquad (5)$$

At step S234 ECU 61 obtains a unit time quantity Qe of EGR gas quantity Qec using the following expression (6).

$$Qe=Qec \times Ne/KCON\# \qquad (6)$$

At step S235 ECU 61 calculates an exhaust gas flow rate on the basis of the obtained quantities Qf, Qa and Qe using the following expression (7).

$$Qexh=Qa+Qe+Qf \times GKQF\# \qquad (7)$$

Figure 12:
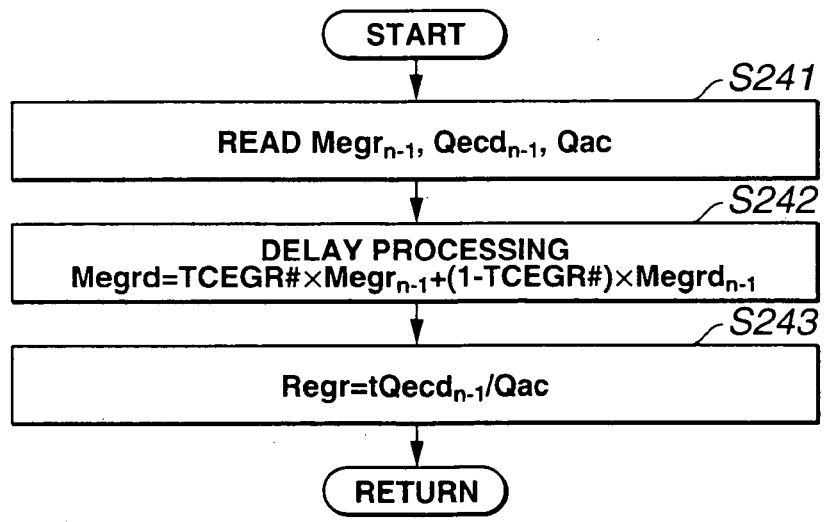
FIG. 12 is a flowchart of an EGR rate calculation routine.

FIG. 12 is a flowchart for an EGR rate calculation routine, which is executed by module M2 of ECU 61.

As discussed above, target EGR rate Megr is approximated by a first-order delay value of actual EGR rate. Accordingly at step S241 ECU 61 reads target EGR rate $Megr_{n-1}$, target EGR gas quantity $tQecd_{n-1}$ and cylinder intake air quantity Qac.

At step S242 ECU 61 obtains the first-order delay value Megrd by executing a first-order delay processing of target EGR rate $Megr_{n-1}$ using the following expression (8), and stores the obtained first-order delay value Mefrd.

$$Megrd=(1-TCECR\#) \times Megrd_{n-1}+TCEGR\# \times Megr_{n-1} \qquad (8)$$

At step S243 ECU calculates an EGR rate Regr by dividing target EGR gas quantity $tQecd_{n-1}$ by cylinder intake air quantity Qac as shown by the following expression (9).

$$Regr=tQece_{n-1}/Qac \qquad (9)$$

Figure 13:
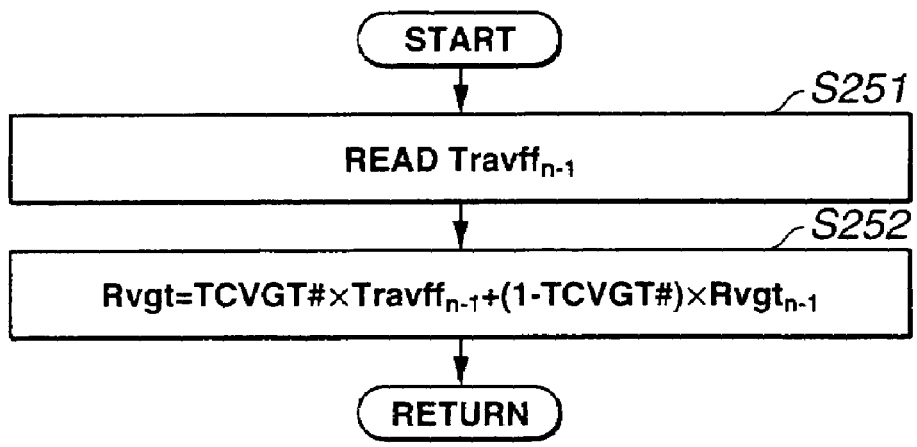
FIG. 13 is a flowchart of a turbine nozzle opening calculation routine

FIG. 13 is a flowchart for a calculation routine of a turbine nozzle opening, which is executed by module M2 of ECU 61.

Target turbine nozzle opening Trav is approximated by a first-order delay value of an actual turbine nozzle opening. Accordingly at step S251 ECU 61 reads a target turbine nozzle opening Travff$_{n-1}$. At step S252 ECU 61 obtains turbine nozzle opening Rvgt by executing a first-order delay processing of target turbine nozzle opening Travff$_{n-1}$ using the following expression (10), and stores the obtained turbine nozzle opening Rvgt.

$$Rvgt=(1-TCVGT\#)\times Rvgt_{n-1}+TCVGT\#\times Travff_{n-1} \qquad (10)$$

Figure 14:
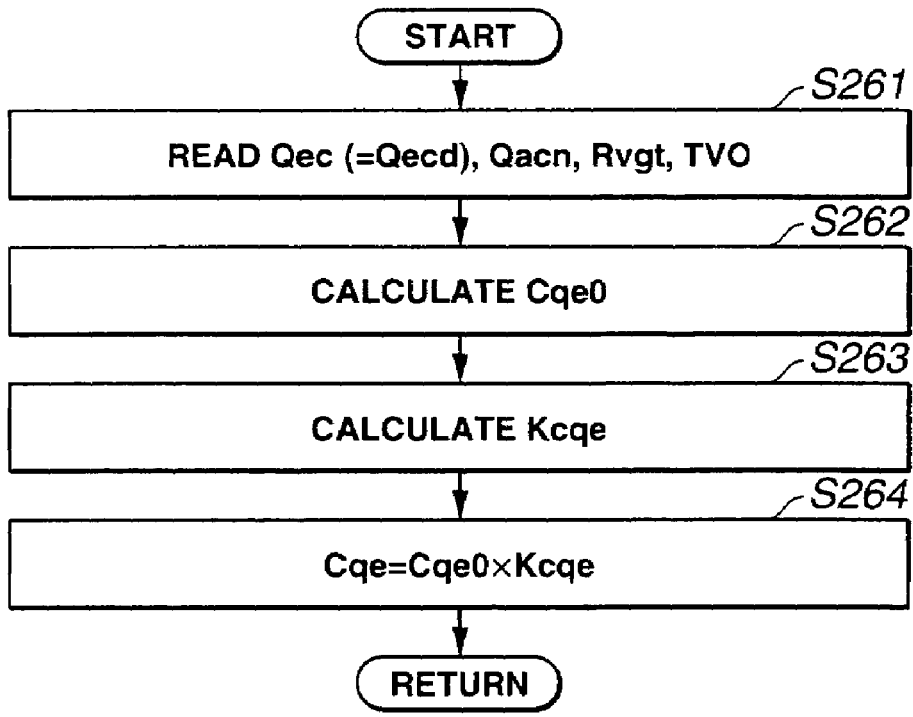
FIG. 14 is a flowchart of an EGR gas flow velocity calculation routine.

FIG. 14 is a flowchart for a calculation routine of an EGR gas flow velocity, which is executed by module M2 of ECU 61.

An EGR gas flow velocity Cqe is obtained on the basis of intake manifold pressure Pint, an exhaust manifold pressure Pexh and an exhaust gas gravity, using the following expression (11).

$$Cqe=\sqrt{(2\rho\times(Pexh-Pint))} \qquad (11)$$

However, it is difficult to accurately measure intake manifold pressure Pint and exhaust manifold pressure Pexh. Accordingly, EGR gas flow velocity Cqe is estimated by the following method.

Figure 15:
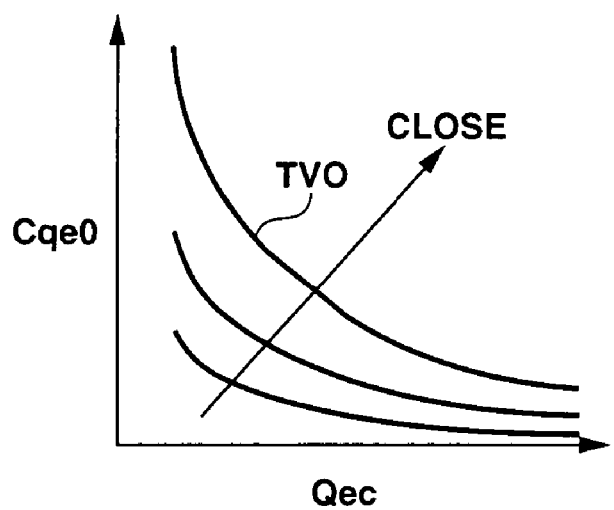
FIG. 15 is a map for obtaining an EGR gas flow velocity basic value.
Figure 16:
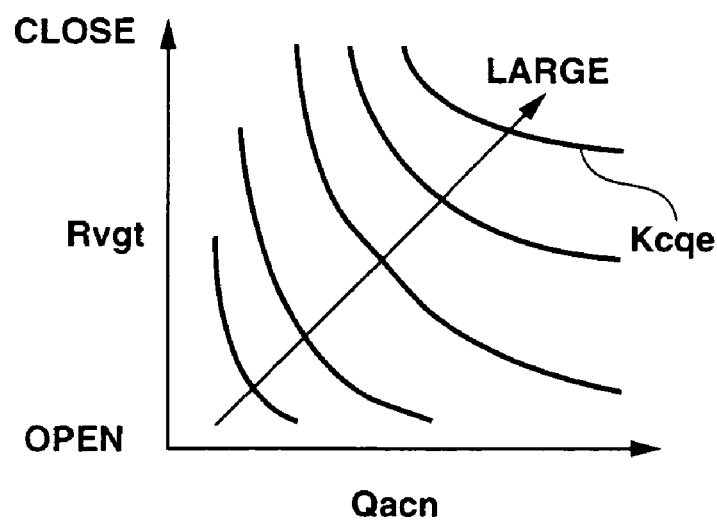
FIG. 16 is a map for obtaining an EGR gas flow velocity correction value.

At step S261 ECU 61 reads EGR gas quantity Qec (=tQecd), intake air quantity Qacn, turbine nozzle opening Rvgt and intake throttle valve opening TVO. At step S262 ECU 61 retrieves (calculates) a flow velocity basic value Cqe0 from a map shown in FIG. 15 using gas quantity Qec and intake throttle valve opening TVO. At step S263 ECU 61 retrieves a flow velocity correction value Kcqe from a map shown in FIG. 16 using intake air quantity Qacn and turbine nozzle opening Rvgt. At step S264 ECU 61 calculates EGR gas flow velocity Cqe by multiplying flow velocity basic value Cqe0 by flow velocity correction value Kcqe (Cqe=Cqe0×Kcqe).

Figure 17:
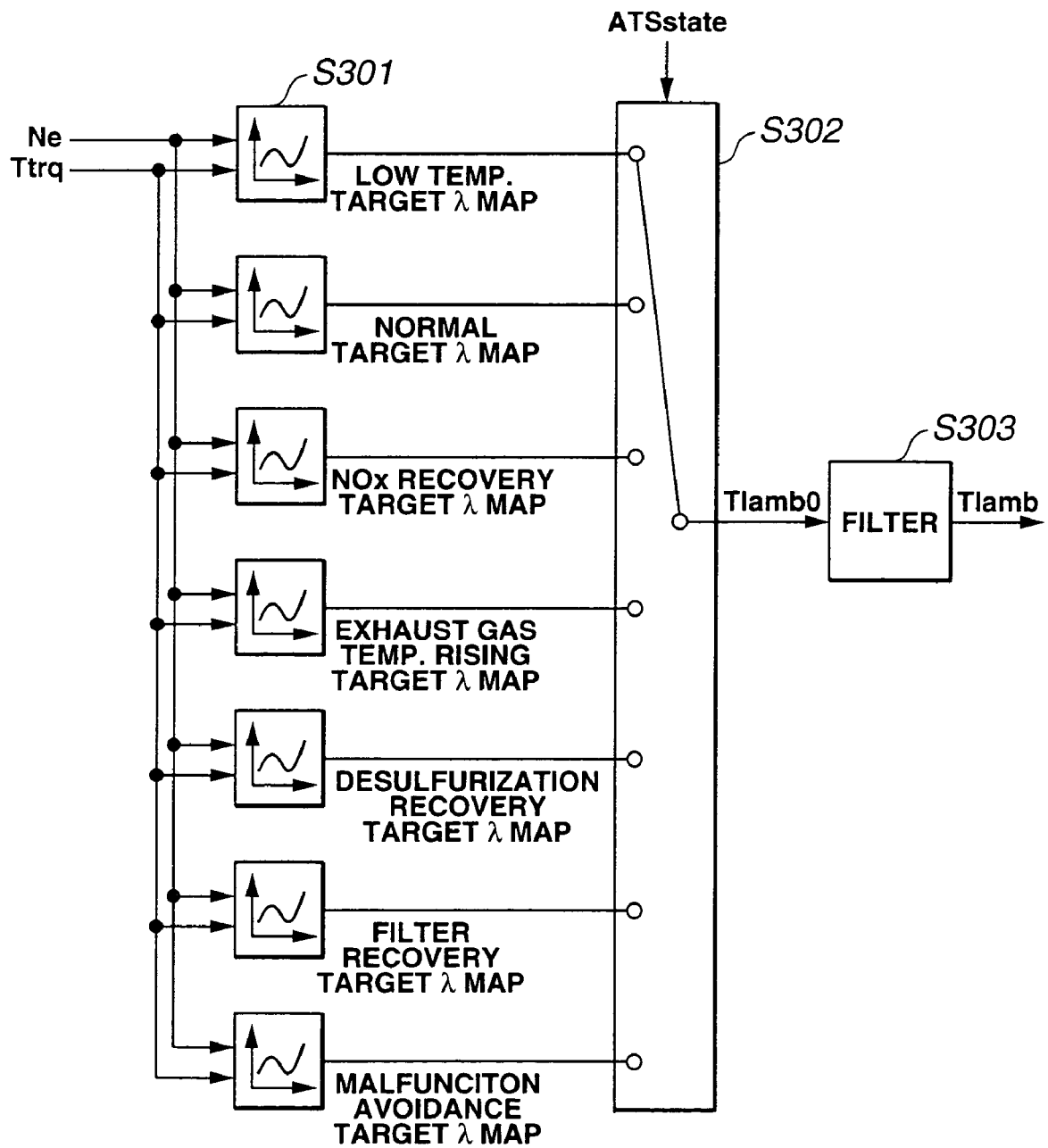
FIG. 17 is a flowchart of a recovery mode target excess air ratio calculation routine.

Herein, there is discussed a setting of a target air/fuel ratio. FIG. 17 is a block diagram showing a calculation routine of a target excess air ratio, which is executed by module M3 of ECU 61.

At steps S301 and S302 ECU 61 reads mode decision value ATSstate and selects a map corresponding to mode decision value ATSstate. Further, ECU 61 retrieves a target excess air ratio basic value Tlamb0 according to the operation mode from the selected map.

Figure 18:
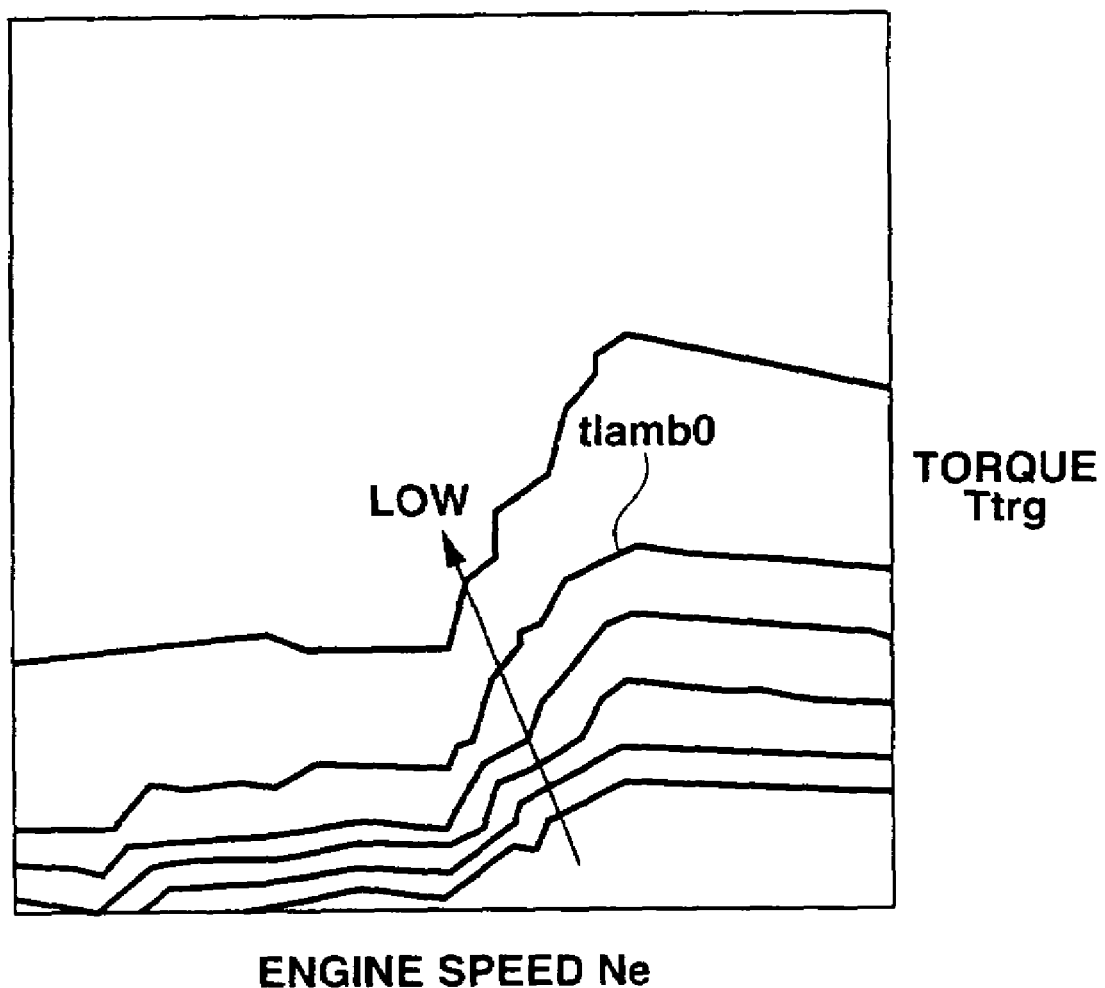
FIG. 18 is a map for obtaining a target excess air ratio basic value.

More specifically, when ATSstate=0, ECU 61 searches a low temperature target λ map and sets target excess air ratio basic value Tlamb0 at 1 indicative of a stoichiometric air/fuel ratio. When ATSstate=1, ECU 61 searches a normal target λ map shown in FIG. 18 and sets target excess air ratio basic value Tlamb0 at 1.4 or more indicative of a lean state. When ATSstate=2, ECU 61 sets target excess air ratio basic value Tlamb0 at 0.9 indicative of a rich state. When ATSstate=3, ECU 61 searches a desulfurization mode target λ map and sets target excess air ratio basic value Tlamb0 at 0.99 indicative of the rich state. When ATSstate=4, ECU 61 searches a filter recovery mode target λ map and sets target excess air ratio basic value Tlamb0 at 1.2 indicative of the lean state.

When ATSstate=3 or 4, an exhaust gas rising mode is executed before the desulfurization mode or the filter recovery mode are executed. During this exhaust gas rising mode, ECU 61 sets target excess air ratio basic value Tlamb0 at 1 indicative of a stoichiometric air/fuel ratio. When the processing of the desulfurization or filter cleaning is suspended due to the excessive rising of the exhaust gas temperature, ECU 61 sets target excess air ratio basic value Tlamb0 at 1.3 or more. That is, During the malfunction avoidance mode, ECU 61 sets target excess air ratio basic value Tlamb0 at a value greater than that during the filter recovery mode.

At step S303 ECU 61 executes a delay processing of target excess air ratio basic value Tlamb0 using the following expression (12) employing intake system response time constant Kkin and obtains a target excess air ratio Tlamb.

$$Tlamb=Tlamb_{n-1}\times(1-Kkin)+Tlamb0\times Kkin \qquad (12)$$

Figure 19:
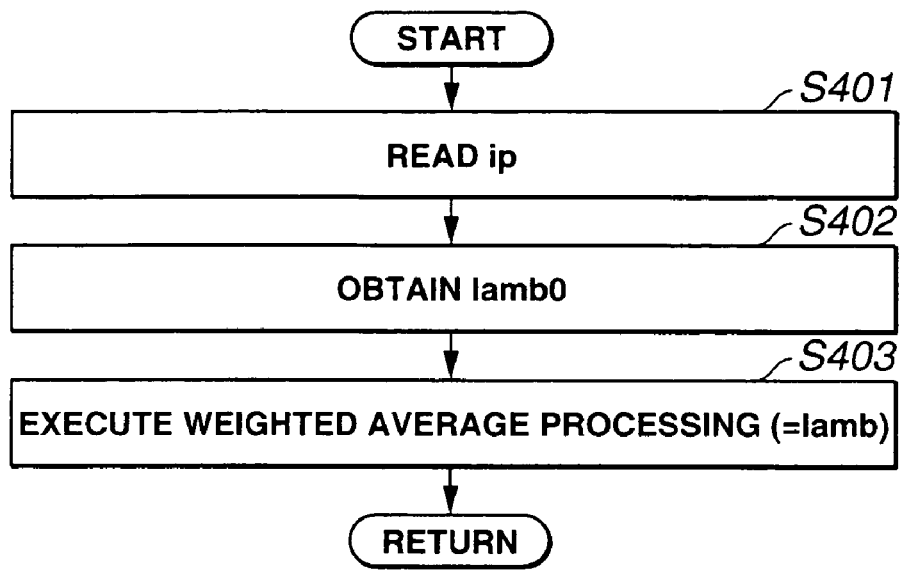
FIG. 19 is a flowchart of an excess air ratio calculation routine.

There is discussed a calculation of the excess air ratio. FIG. 19 is a flowchart for an excess air ratio calculation routine, which is executed by module M4 of ECU 61.

Figure 20:
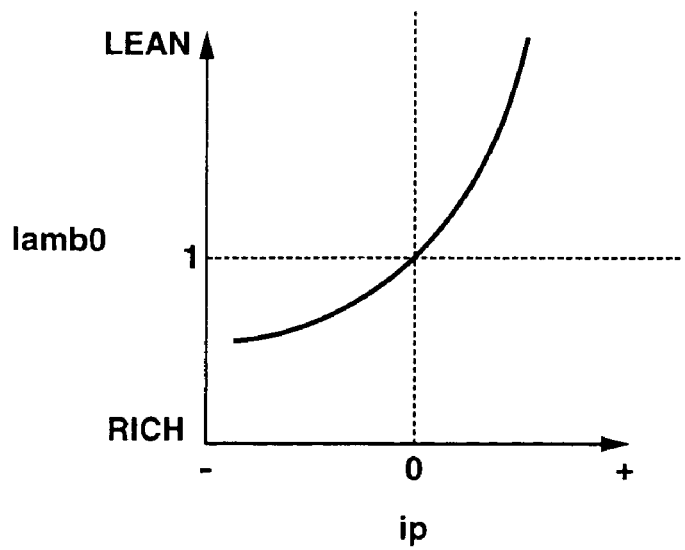
FIG. 20 is a conversion table between a pump current and the excess air ratio.

At step S401 ECU 61 reads a pump current ip from sensor 72. At step S402 ECU 61 obtains excess air ratio lamb0 from a table shown in FIG. 20 using pump current ip. At step S403 ECU 61 executes a weighted average processing of excess air ratio lamb0 and sets the obtained value as excess air ratio lamb.

There is discussed a setting of an engine controlled variable. FIG. 21 is a flowchart for a calculation routine of a torque correction coefficient, which is executed by module M5 of ECU 61. ECU 61 determines a torque correction coefficient Ka according to target excess air ratio Tlamb and main injection timing MITf and uses the obtained torque correction coefficient Ka in a target intake air quantity calculation routine and a target fuel injection calculation routine.

At step S501 ECU 61 reads target excess air ratio Tlamb, engine speed Ne and main injection quantity MITf. At step S502 ECU 61 retrieves a first torque correction coefficient KaLAMB from a map shown in FIG. 22A with reference to target excess air ratio Tlamb and engine speed Ne and retrieves a second torque correction coefficient KaMIT from a map shown in FIG. 22B with reference to main fuel injection timing MITf and engine speed Ne. The first torque correction coefficient KaLAMB is set to adapt to a change of target excess air ratio Tlamb during the recovery mode and is set at a value, which is greater than 1 and increases as target excess air ratio Tlamb is decreased, when target excess air ratio Tlamb is smaller than 1.4. Further, the first torque correction coefficient KaLAMB is set at 1 when target excess air ratio Tlamb is greater than or equal to 1.4. On the other hand, the second torque correction coefficient KaMIT is set to adapt to a change of main injection timing MITf during the recovery mode, and is set at a value, which is greater 1 when main injection timing MITf is retarded relative to a normal timing MIT0 and which increases as the degree of the retard of main injection timing MITf increases. Second torque correction coefficient KaMIT is normally set at 1.

At step S503 ECU 61 obtains torque correction coefficient Ka by multiplying first torque correction coefficient KaLAMB and second torque correction coefficient KaMIT (Ka=KaLAMB×KaMIT).

Figure 23:
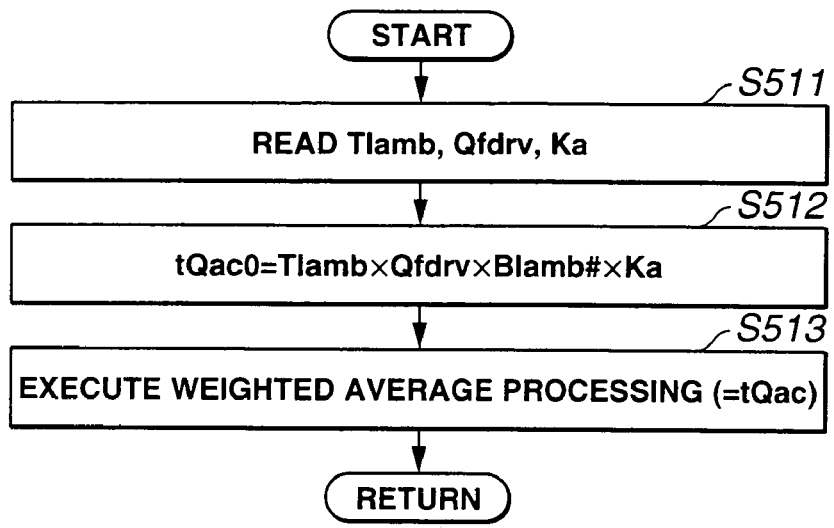
FIG. 23 is a flowchart of a target intake air quantity calculation routine.

FIG. 23 is a flowchart for a target intake air quantity calculation routine, which is executed by module M5 of ECU 61.

At step S511 ECU 61 reads target excess air ratio Tlamb, target acceleration demand injection quantity Qfdrv and torque correction coefficient Ka. At step S512 ECU 61 calculates a target intake air quantity basic value tQac0 from the following expression (13) on the basis of target excess air ratio Tlamb, target acceleration demand injection quantity Qfdrv and torque correction coefficient Ka.

$$tQac0 = Tlamb \times Qfdrv \times Blamb\# \times Ka \quad (13)$$

where Blamb3 is a stoichiometric air/fuel ratio corresponding value (14.7).

At step S513 ECU 61 executes a weighted average processing of target intake air quantity basic value tQac0 and sets the obtained value as target intake air quantity tQac.

Figure 24:
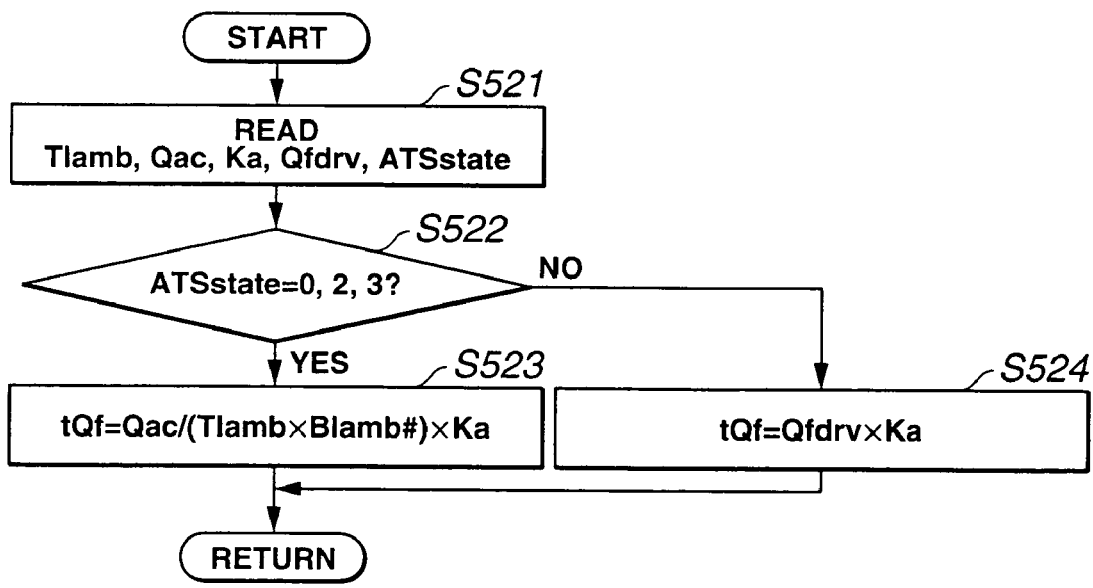
FIG. 24 is a flowchart of a target fuel injection quantity calculation routine.

FIG. 24 is a flowchart for a target fuel injection quantity calculation routine, which is executed by module M5 of ECU 61.

At step S521 ECU 61 reads target excess air ratio Tlamb, intake air quantity Qac, target accelerating request injection quantity Qfdrv, torque correction coefficient ka and mode decision value ATSstate. At step S522 ECU 61 determines whether or not mode decision value ATSstate is one of 0, 2 and 3. When the determination at step S522 is affirmative, that is, when mode decision value ATSstate is one of 0, 2 and 3, the air/fuel ratio is controlled at a rich state or stoichiometric state, and therefore engine torque is mainly dependent on intake fresh air. Accordingly the program proceeds to step S523 wherein ECU 61 calculates target fuel injection quantity tQf using the following expression (14) on the basis of intake air quantity Qac.

$$tQf = Qac/(Tlamb \times Blamb\#) \times Ka \quad (14)$$

On the other hand, when the determination at step S522 is negative, that is, when mode decision value ATSstate is neither of 0, 2 nor 3, the air/fuel ratio is controlled at lean state, and therefore the engine torque is mainly determined by the fuel injection quantity. Accordingly, the program proceeds to step S524 wherein ECU 61 calculates target fuel injection quantity tQf using the following expression (15) on the basis of target accelerating request injection quantity Qfdrv.

$$tQf = Qfdr \times Ka \quad (15)$$

Figure 25:
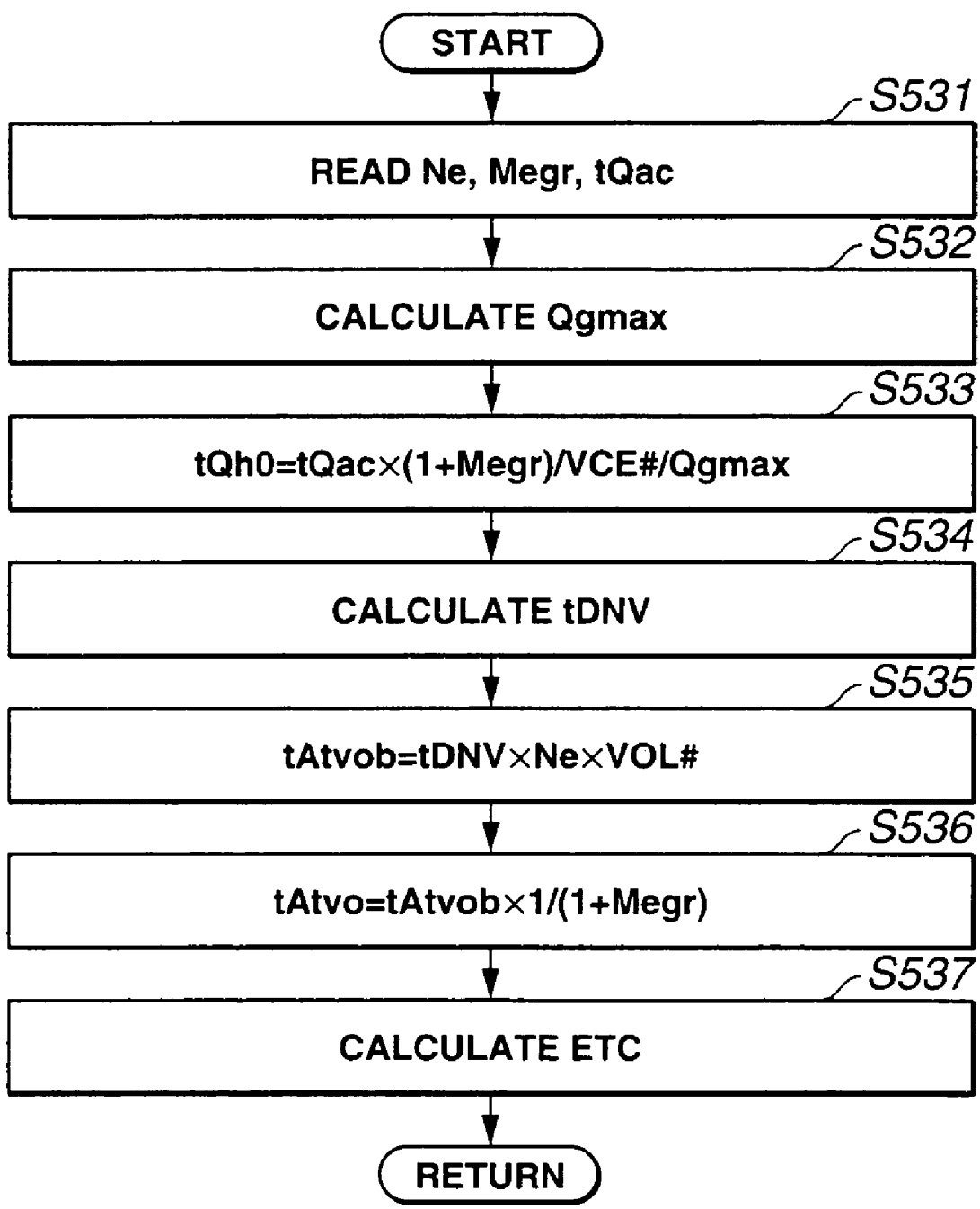
FIG. 25 is a flowchart of an intake throttle valve opening calculation routine.

FIG. 25 is a flowchart for an intake throttle valve opening calculation routine, which is executed by module M5 of ECU 61.

Figure 26:
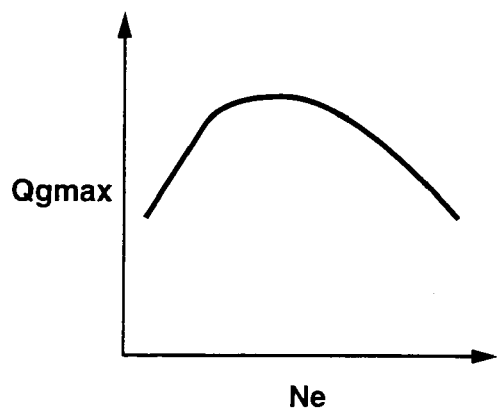
FIG. 26 is a table for obtaining a maximum working gas quantity.

At step S531 ECU 61 reads engine speed Ne, target EGR rate Megr and target intake air quantity tQac. At step S532 ECU 61 retrieves a maximum working gas quantity Qgmax from a table shown in FIG. 26 with reference engine speed Ne. At step S533 ECU 61 calculates a target working gas quantity ratio tQh0 from the following expression (16) on the basis of target intake air quantity tQac.

$$tQh0 = tQac \times (1 + Megr)/VCE\#/Qgmax \quad (16)$$

where VCE# is a stroke volume of piston.

Figure 27:
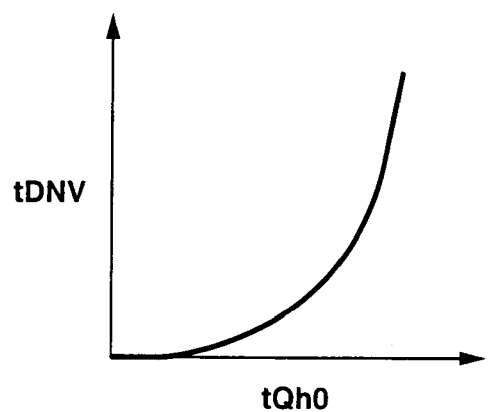
FIG. 27 is a table for obtaining an intake air quantity ratio.

At step S534 ECU 61 obtains a target air flow rate tDNV through a conversion of target working gas quantity ratio tQh0 using a table shown in FIG. 27. At step S535 ECU 61 calculates a target opening area basing value tAtvob from the following expression (17) on the basis of target air flow rate tDNV and engine speed Ne.

$$tAtvob = tDNV \times Ne \times VOL\# \quad (17)$$

Figure 28:
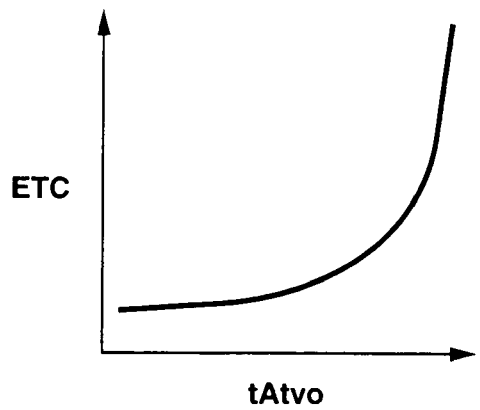
FIG. 28 is a conversion table between an opening area and a valve opening.

At step S536 ECU 61 calculates a target intake throttle value opening area tAtvo from the following expression (18) on the basis of target opening area basing value tAtvob and target EGR rate Megr.

$$tAtvo = tAtvob \times 1/(1 + Megr) \quad (18)$$

where tAtvo is a value obtained by correcting target opening area basic value tAtvob, which is a target opening area with respect to the total working gas, by target EGR rate Megr. At step S537 ECU 61 obtains intake throttle valve opening ETC through a conversion of target intake throttle valve opening area tAtvo using a table shown in FIG. 28.

Figure 29:
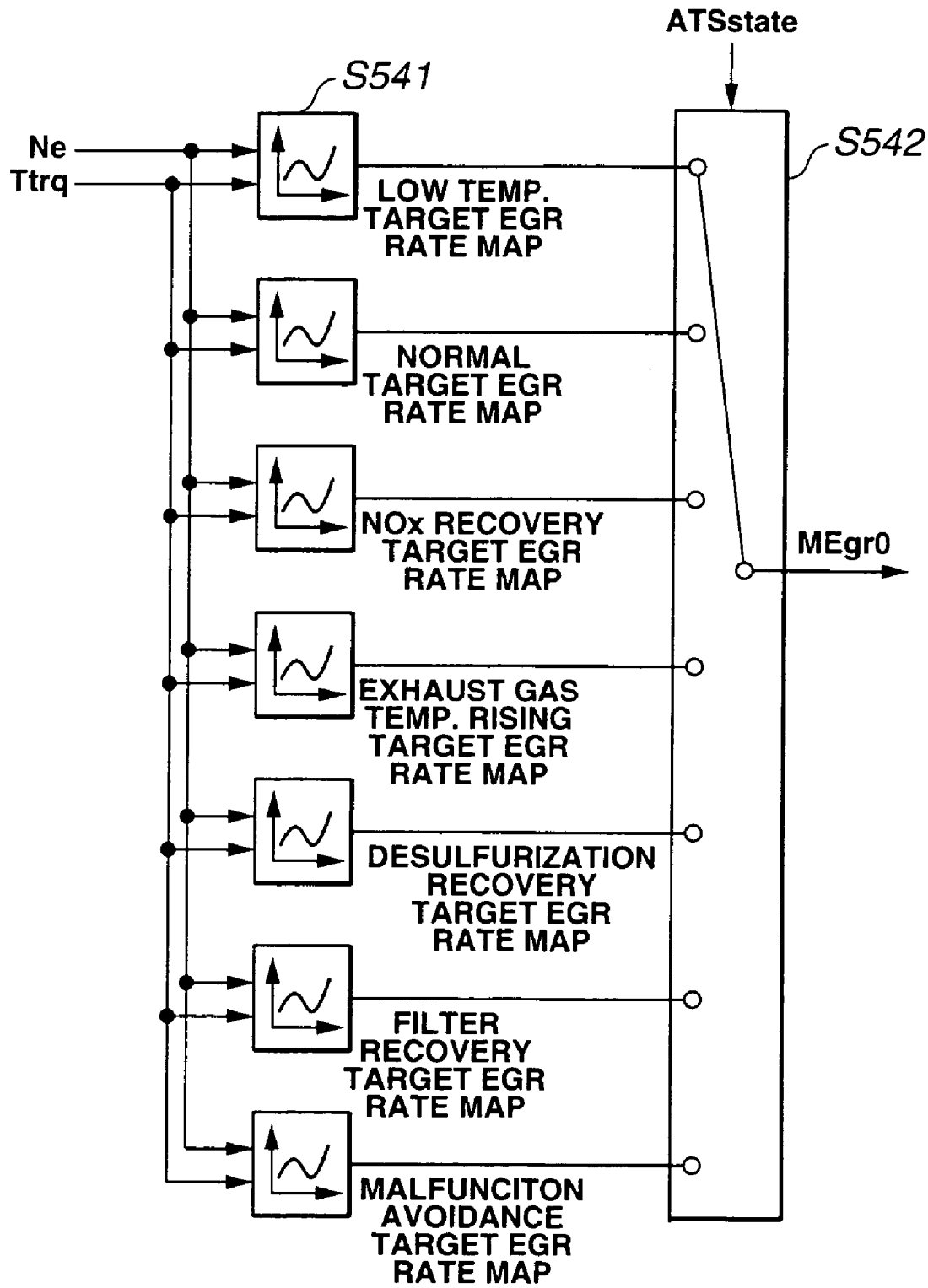
FIG. 29 is a flowchart of a target EGR rate basic value calculation routine.

FIG. 29 is a flowchart for a calculation routine of a target EGR rate basic value, which is executed by module M5 of ECU 61.

At steps S541 and S542 ECU 61 reads mode decision value ATSstate and selects a map corresponding to mode decision value ATSstate. Further, ECU 61 retrieves target EGR rate basis value Megr0 according to the operation mode from the selected map.

Figure 30:
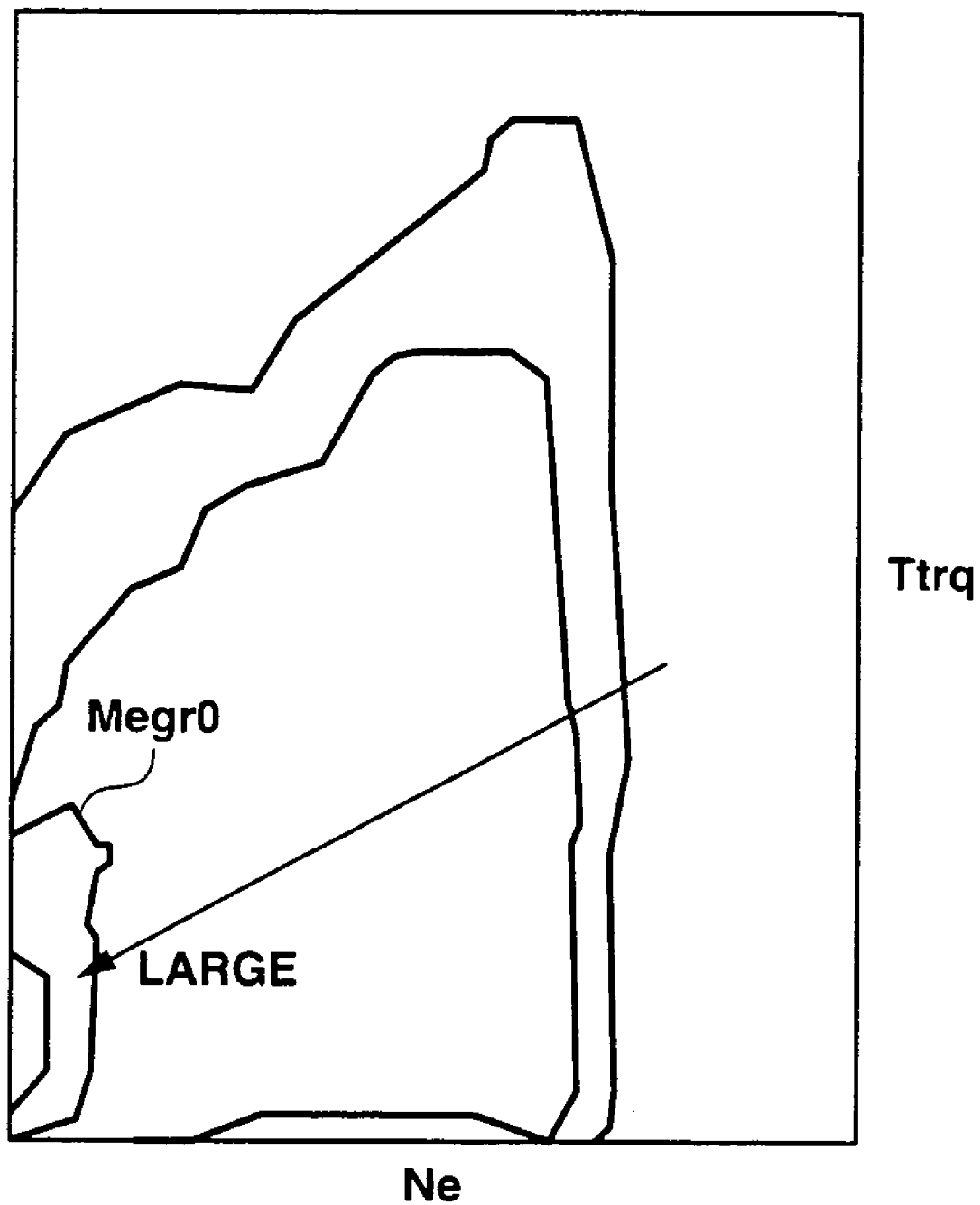
FIG. 30 is a map for obtaining a target EGR rate basic value.

More specifically, when ATSstate=1, ECU 61 searches a standard map shown in FIG. 30 and sets normal value as target EGR rate basis value Megr0. When ATSstate=0, ECU 61 obtains a low temperature target EGR rate basic value Megr0 by multiplying standard target EGR rate basic value Megr0 and a correction coefficient 0.2 as target EGR rate basis value Megr0 (Megr0=Megr0×0.2). When ATSstate=2, ECU 61 obtains NOx recovery target EGR rate basic value Megr0 by multiplying standard target EGR rate basic value Megr0 and a correction coefficient 0.8 as target EGR rate basis value Megr0 (Megr0=Megr0×0.8). When ATSstate=3, ECU 61 obtains a desulfurization mode target EGR rate basic value Megr0 by multiplying standard target EGR rate basic value Megr0 and a correction coefficient 0 as target EGR rate basis value Megr0 (Megr0=Megr0×0). When ATSstate=4, ECU 61 sets filter recovery mode target EGR rate basic value Megr0 by multiplying standard target EGR rate basic value Megr0 and a correction coefficient 0.5 as target EGR rate basis value Megr0 (Megr0=Megr0×0.5).

When ATSstate=3 or 4 and when one of desulfurization mode and filter recovery mode is executed, if exhaust gas rising mode is selected, ECU 61 sets exhaust gas rising mode target EGR rate basic value Megr0 obtained by multiplying standard target EGR rate basic value Megr0 and a correction coefficient 0 as target EGR rate basis value Megr0 (Megr0=Megr0×0). Therefore, ECU 61 stops EGR. When a malfunction avoiding mode is selected, ECU 61 sets malfunction avoiding mode target EGR rate basic value Megr0 obtained by multiplying standard target EGR rate basic value Megr0 and a correction coefficient 0.8 as target EGR rate basis value Megr0 (Megr0=Megr0×0.8).

Figure 31:
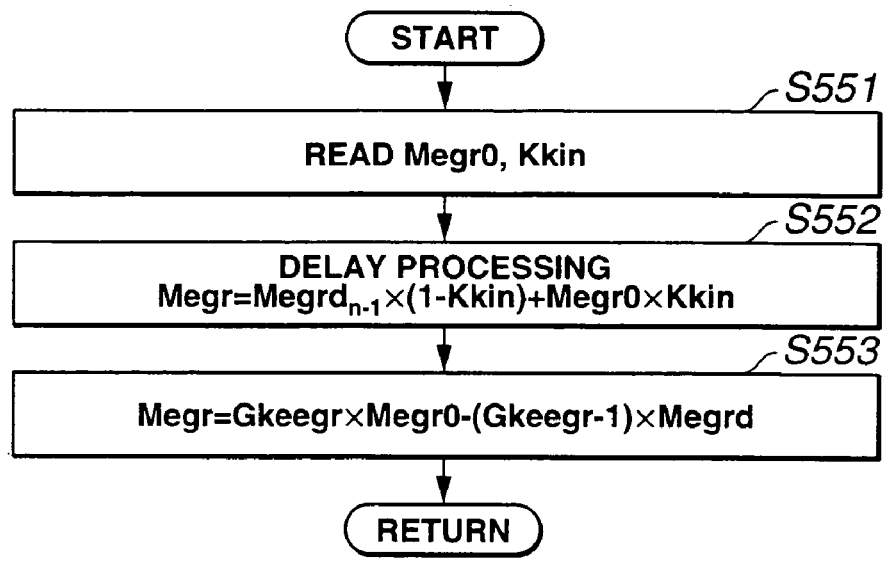
FIG. 31 is a flowchart of a target EGR rate calculation routine.

FIG. 31 is a flowchart for a calculation routine of a target EGR rate, which is executed by module M5 of ECU 61.

At step S551 ECU 61 reads target EGR rate basic value Megr0 and intake system response time constant Kkin. At step S552 ECU 61 executes a delay processing of target EGR rate basic value Megr0 using the following expression (19) which includes intake system response time constant Kkin, and stores the obtained value as Megrd.

$$Megrd = Megrd_{n-1} \times (1 - Kkin) + Mger0 \times Kkin \quad (19)$$

At step S553 ECU 61 calculates target EGR rate Megr by executing an advance processing of Megrd using the following expression (20) which employs GKeegr as a coefficient.

$$Megr = -Gkeegr \times -Megr0 - (GKeegr-1) \times Megrd \quad (20)$$

Figure 32:
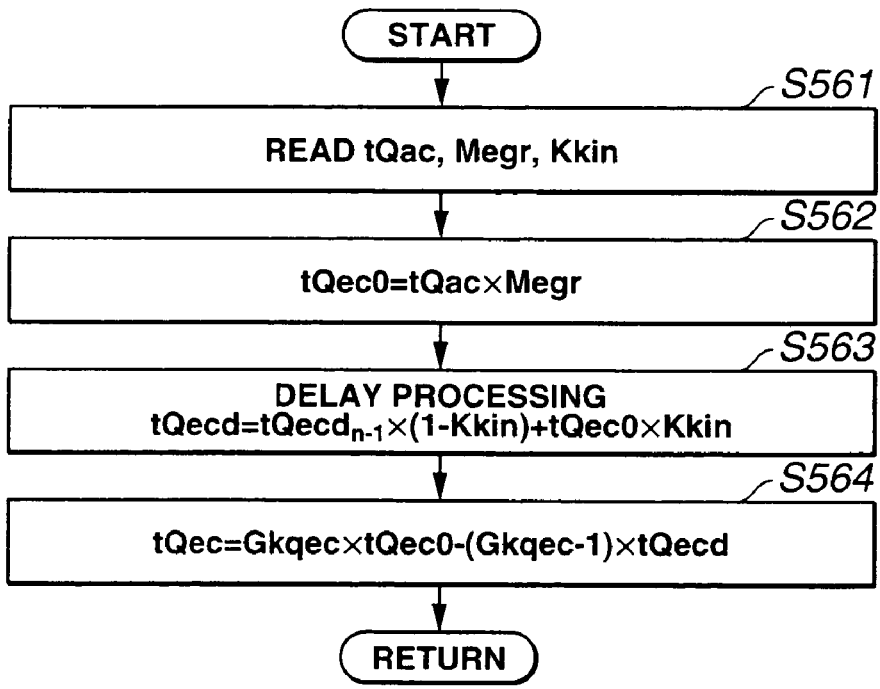
FIG. 32 is a flowchart of a target EGR gas quantity calculation routine.

FIG. 32 is a flowchart for a calculation routine of a target EGR gas quantity, which is executed by module M5 of ECU 61.

At step S561 ECU 61 reads target intake air quantity tQac, target EGR rate Megr and intake system response time constant Kkin. At step S562 ECU 61 obtains a target EGR gas quantity basic value Qec0 by multiplying trget intake air quantity tQac and target EGR rate Megr (Qec0=tQac×Megr). At step S563 ECU 61 executes a delay processing of target intake air quantity tQac using the following expression (21) which includes intake system response time constant Kkin, and stores the obtained value as tQecd.

$$tQecd = tQecd_{n-1} \times (1 - Kkin) + tQec0 \times Kkin \quad (21)$$

At step S564 ECU 61 obtains a target EGR gas quantity tQec by executing an advance processing of tQecd using the following expression (22) which includes intake system response time constant Kkin.

$$tQec = GKqec \times tQec0 - (Gkqec - 1) \times tQecd \quad (22)$$

Figure 33:
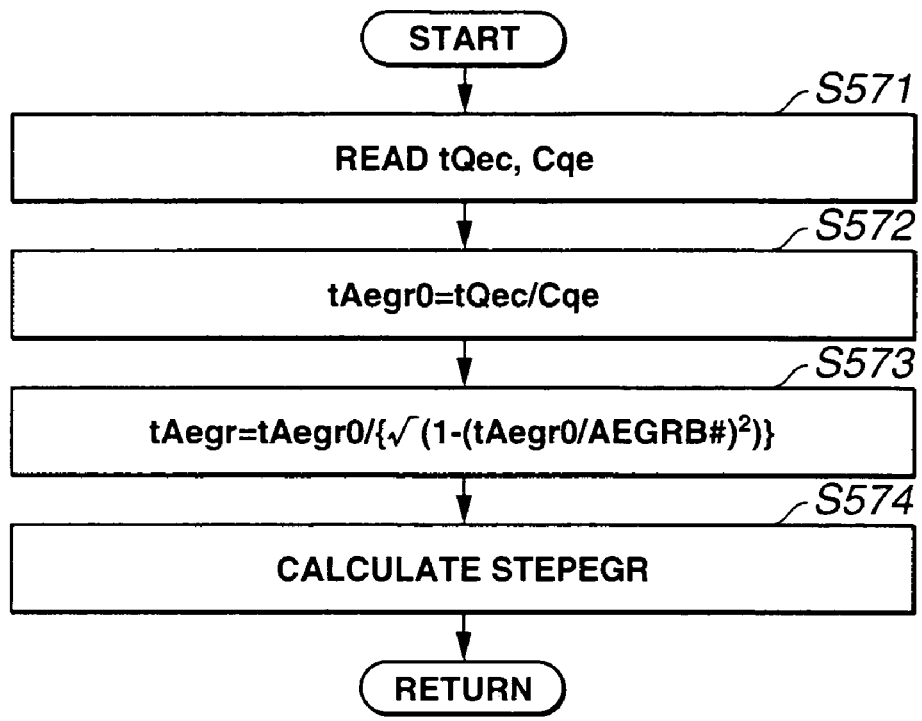
FIG. 33 is a flowchart of a target EGR valve opening calculation routine.

FIG. 33 is a flowchart of a calculation routine of a target EGR valve opening, which is executed by module M5 of ECU 61.

At step S571 reads target EGR gas quantity tQec and EGR gas flow velocity Cqe. At step S572 ECU 61 obtains a target EGR valve opening basic value tAegr0 by diving target EGR gas quantity tQec by EGR gas flow velocity Cqe (tAegr0=tQec/Cqe). At step S573 ECU 61 calculates a target EGR valve opening tAegr from the following expression (23) on the basis of target EGR valve opening basis value tAegr0. The calculation of target EGR valve opening tAegr depends on a calculation method based on a Venturi model.

$$tAegr = tAegr0 / \{\sqrt{(1 - (tAegr0/AEGRB\#)^2)}\} \quad (23)$$

where AEGRB# is a representative cross-sectional area of EGR passage.

Figure 34:
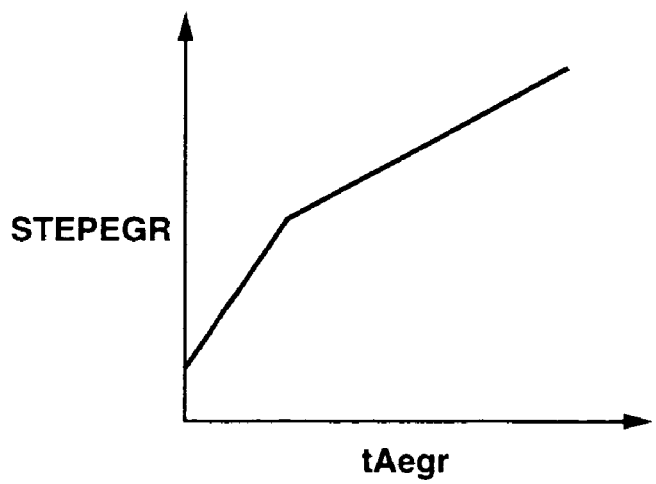
FIG. 34 is a conversion table between a valve opening and number of steps.

At step S574 ECU 61 obtains an EGR valve step number STEPEGR by converting target EGR valve opening tAegr using a table shown in FIG. 34.

Figure 35:
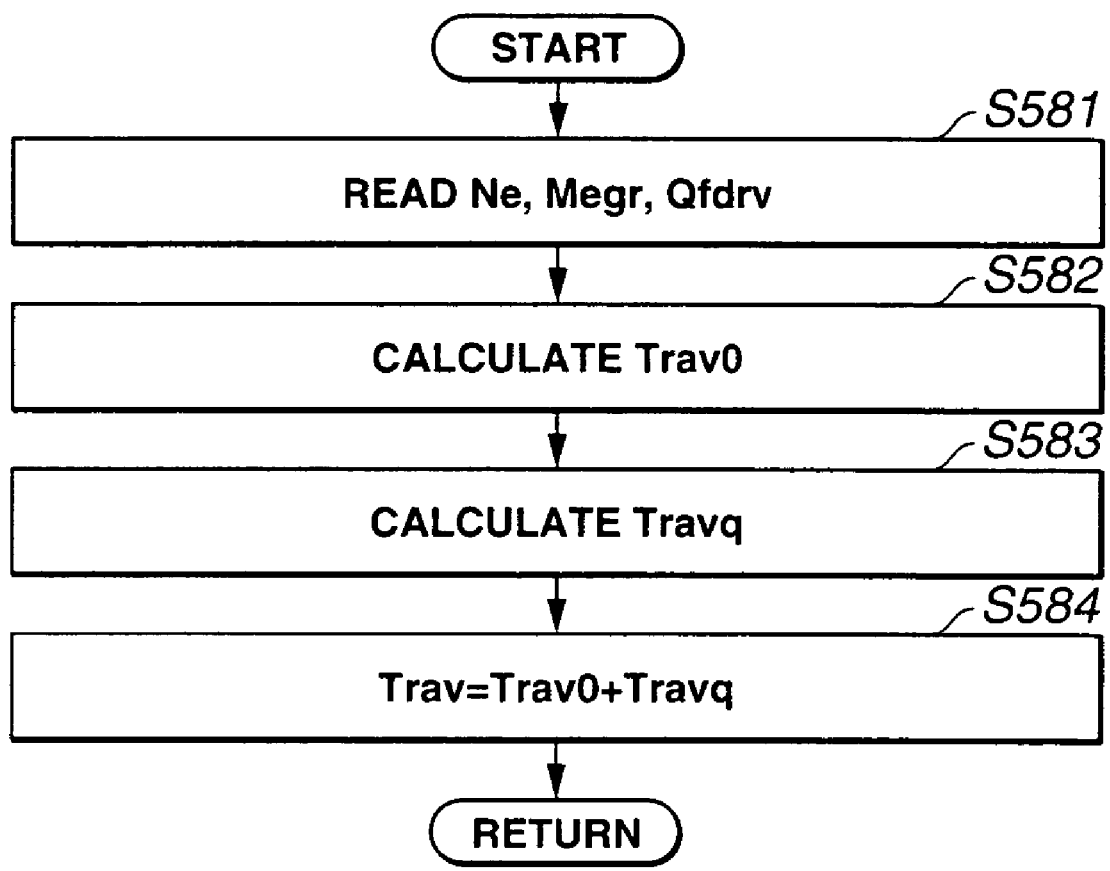
FIG. 35 is a flowchart of a target turbine nozzle opening calculation routine.

FIG. 35 is a flowchart of a calculation routine of a target turbine nozzle opening, which is executed by module M5 of ECU 61.

Figure 36:
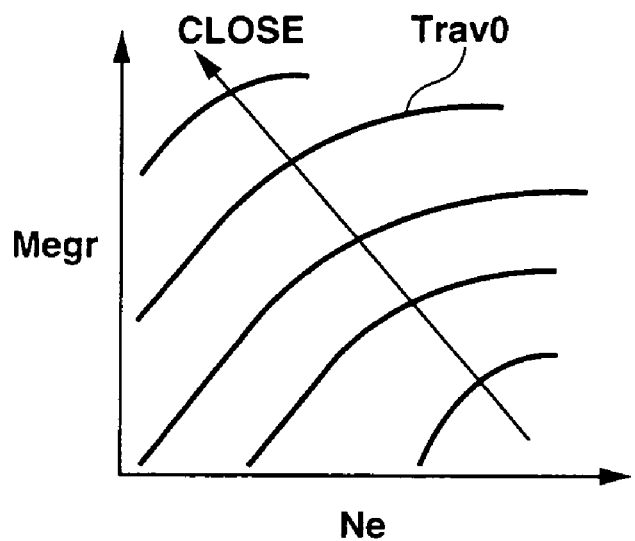
FIG. 36 is a map for obtaining a turbine nozzle opening basic value.
Figure 37:
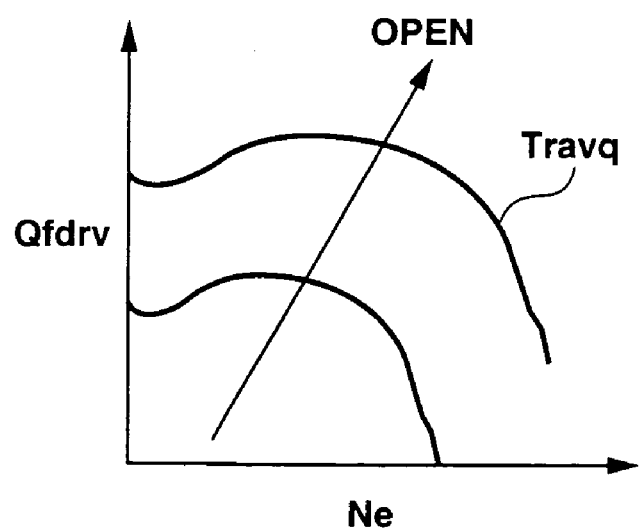
FIG. 37 is a map for obtaining a turbine nozzle opening correction value.

At step S581 ECU 61 reads engine speed Ne, target EGR rate Megr and target acceleration request injection quantity Qfdrv. At step S582 ECU 61 retrieves a turbine nozzle opening basic value Trav0 for achieving target excess coefficent Tlamb and target EGR rate Megr from a map shown in FIG. 36 with reference to engine speed Ne and target acceleration request injection quantity Qfdrv. At step S583 ECU 61 retrieves a turbine nozzle opening correction value Travq from a map shown in FIG. 37 with reference to engine speed Ne and target acceleration request injection quantity Qfdrv. At step S584 ECU 61 obtains a target turbine nozzle opening Trav by adding turbine nozzle opening basic value Trav0 and turbine nozzle opening correction value Travq (Trav=Trav0+Travq).

Figure 38:
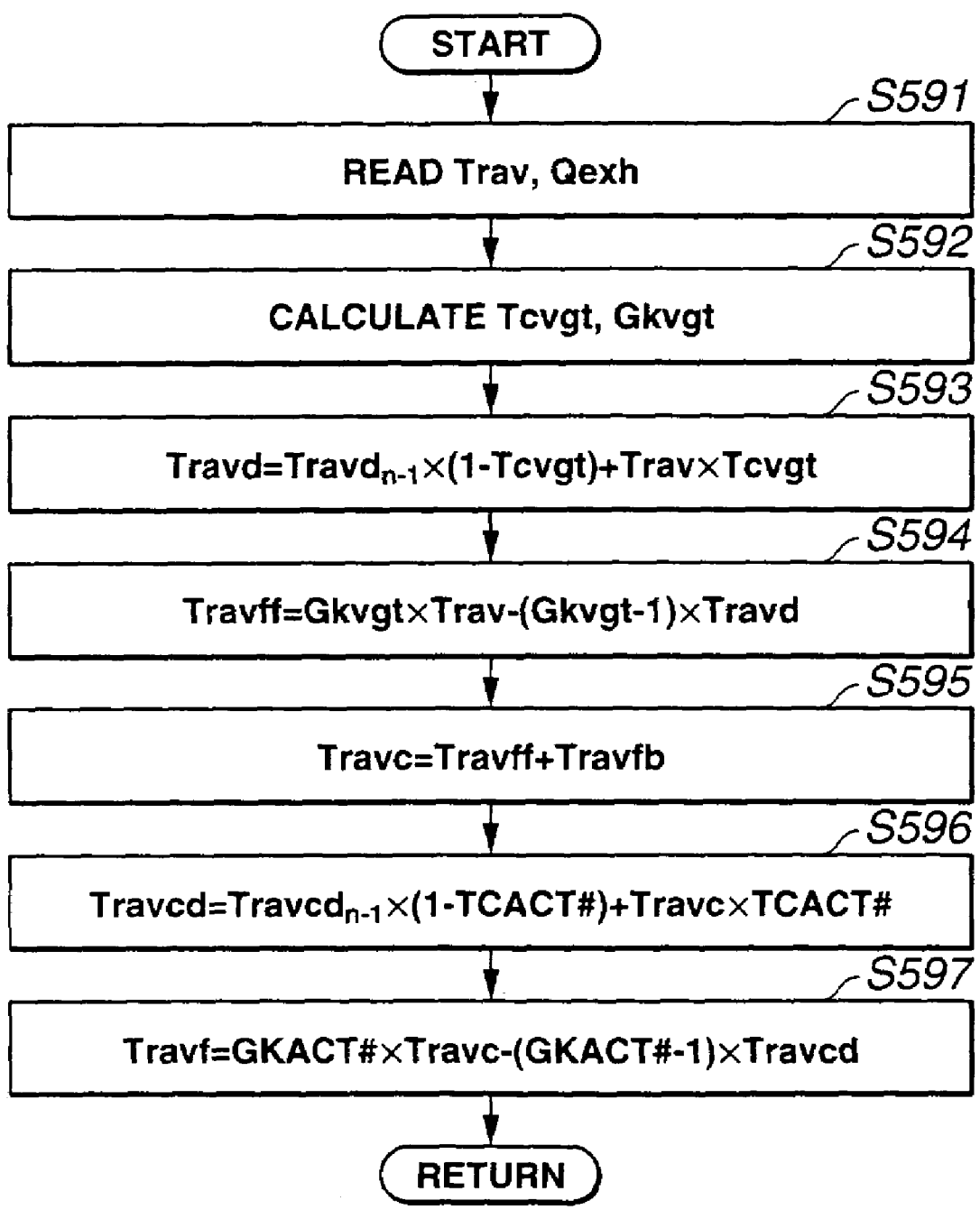
FIG. 38 is a flowchart of a target turbine nozzle opening delay compensation routine.

FIG. 38 is a flowchart of a response delay compensation routine of a target turbine nozzle opening Trav, which is executed by module M5 of ECU 61.

Variable nozzle type turbocharger 15 generates a response delay of gas flow and an operational delay of actuator 15 for driving a variable vane of turbine 15b. The response delay varies according to an exhaust gas flow rate Qexh on the assumption that the response delay includes operational delays of compressor 15a and turbine 15b. The operational delay of actuator 51 is constant. At steps S593 and S594 ECU 61 compensates the response delay, and at steps S596 and S597 ECU 61 compensates the operational delay.

Figure 39:
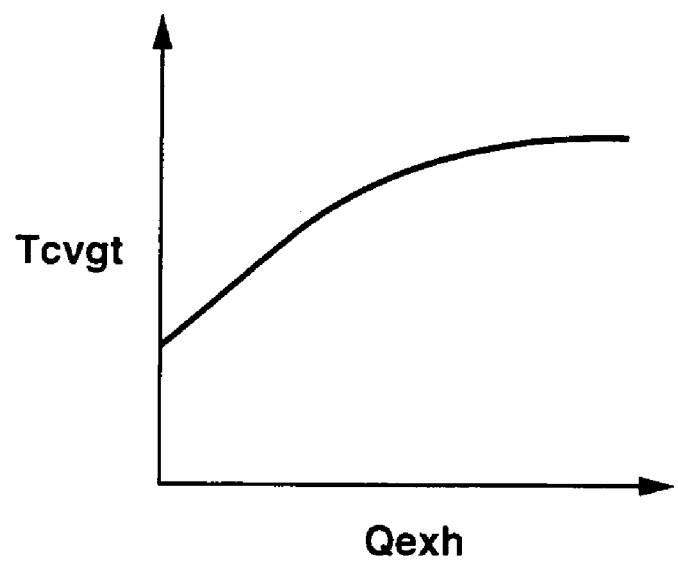
FIG. 39 is a table for obtaining an exhaust system response time constant.
Figure 40:
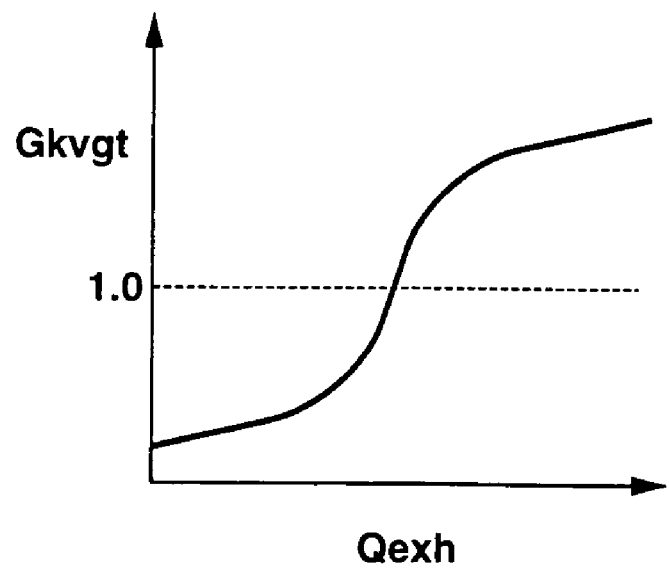
FIG. 40 is a table for obtaining an advance compensation coefficient.

At step S591 ECU 61 reads target turbine nozzle opening Trav and exhaust gas flow rate Qexh. At step S592 ECU 61 retrieves an exhaust system response time constant Tcvgt from a table shown in FIG. 39 with reference to exhaust gas flow rate Qexh, and retrieves an advance compensation coefficient Gkvgt from a map (table) shown in FIG. 40 with reference to exhaust gas flow rate Qexh. At step S593 ECU 61 executes a delay processing of target EGR rate Megr using the following expression (24) which includes exhaust system response time constant Tcvgt and stores the obtained value as Travd.

$$Travd = Travd_{n-1} \times (1 - Tcvgt) + Trav \times Tcvgt \quad (24)$$

At step S594 ECU 61 executes an advance processing of target turbine nozzle opening Trav using the following expression (25) which includes advance compensation coefficient GKvgt, and stores the obtained value as Travff.

$$Travff = GKvgt \times Trav - (GKvgt - 1) \times Travd \quad (25)$$

At step S595 ECU 61 obtains a sum of Traveff and Travefb and stores the obtained value as Travc (Travc=Travff+Travfb), wherein Travfb is a feedback correction quantity obtained on the basis of target intake air quantity tQac and intake air quantity Qac.

At step S596 ECU 61 executes a delay processing of Travc using the following expression (26) which includes a drive system response time constant TCACT#, and stores the obtained value as Travcd.

$$Travcd = Travcd_{n-1} \times (1 - TCACT\#) \times Travc \times TCACT\# \quad (26)$$

At step S597 ECU 61 calculates a target turbine nozzle opening Travf by executing an advance processing of Travc using the following expression (27) which employs GKACT# as a coefficient.

$$Travf = CKACT\# \times Travc - (GKACT\# - 1) \times Travcd \quad (27)$$

Figure 41:
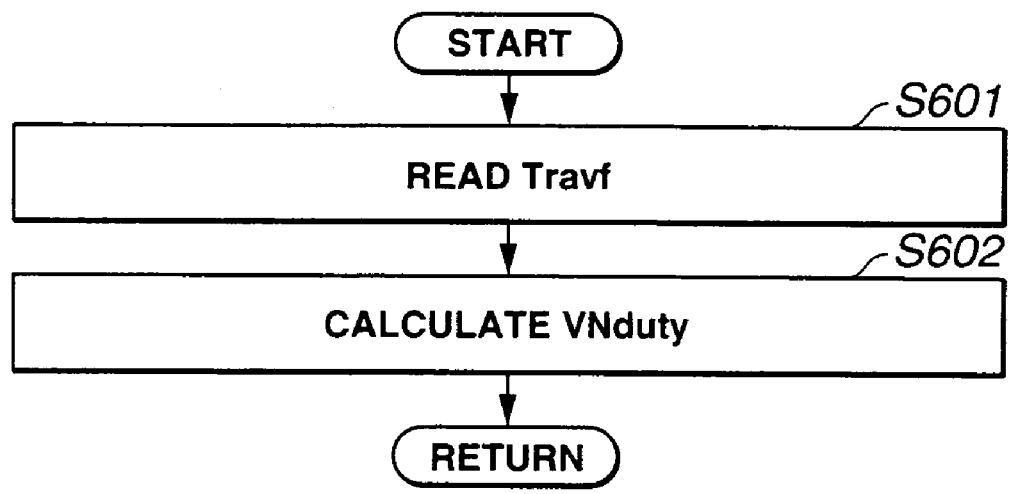
FIG. 41 is a flowchart of a target duty ratio calculation routine.

FIG. 41 is a flowchart of a target duty ratio calculation routine which is executed by module M5 of ECU 61.

Figure 42:
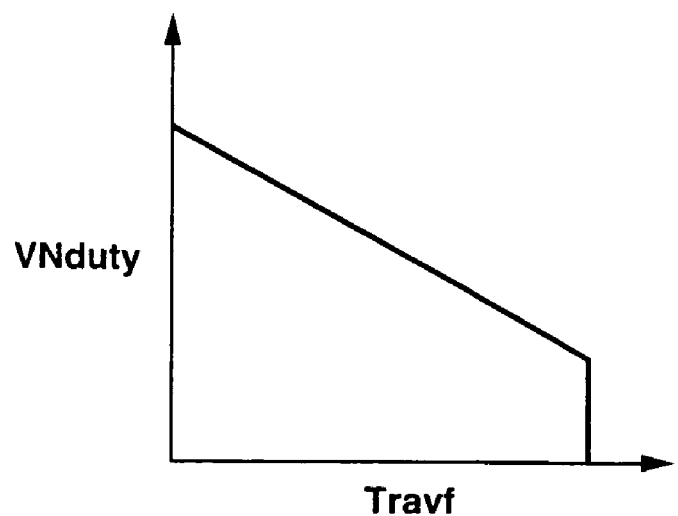
FIG. 42 is a conversion table between a nozzle opening and a duty ratio.

At step S601 ECU 61 reads target turbine nozzle opening Travf. At step S602 ECU 61 retrieves a target duty ratio VNduty, which is a signal of driving actuator 51 from a map (table) shown in FIG. 42 with reference to target turbine nozzle opening Travf.

Figure 43:
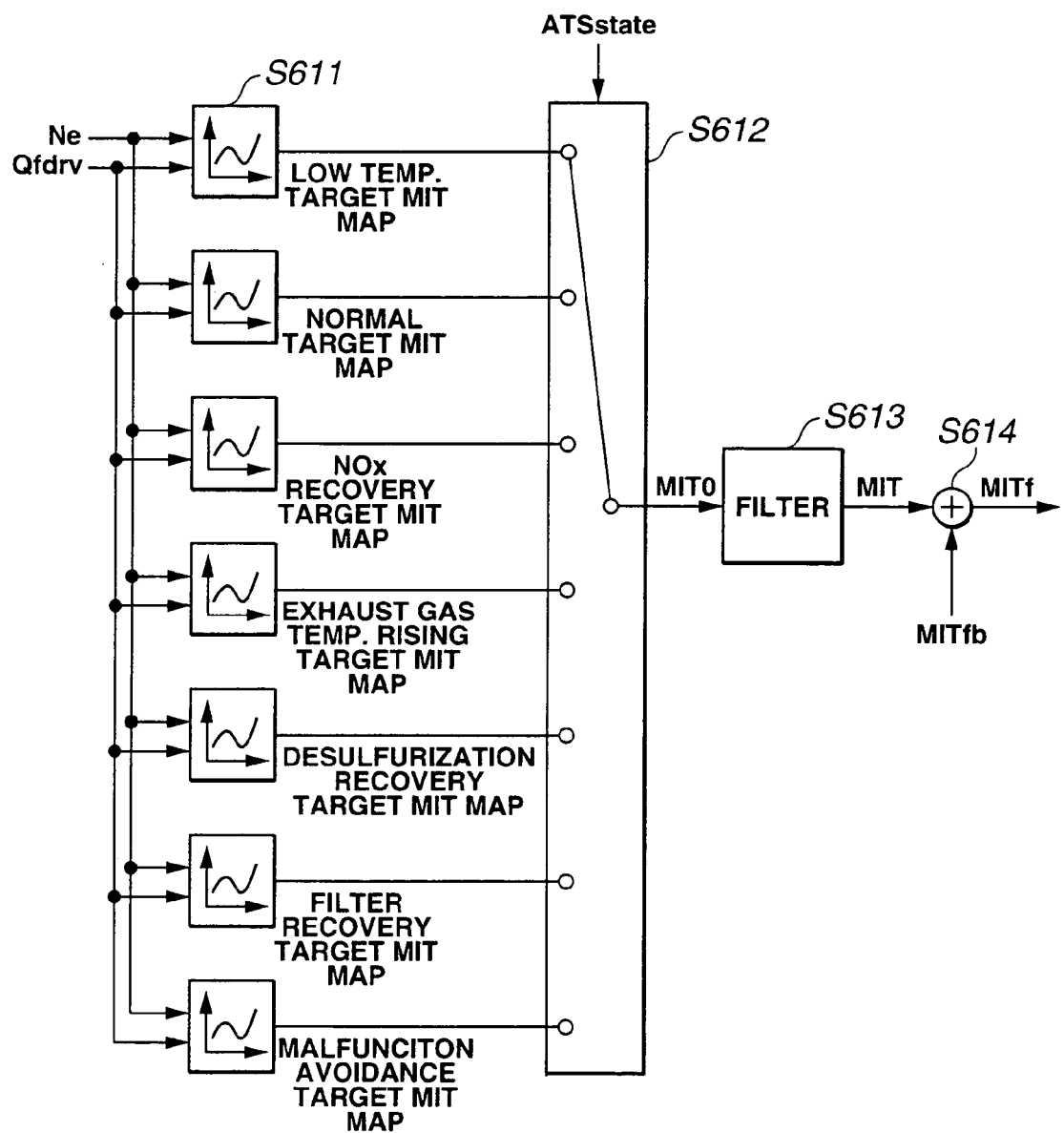
FIG. 43 is a flowchart of a main injection timing calculation routine.

FIG. 43 is a flowchart of a target main injection timing calculation routine, which is executed by module M5 of ECU 61.

At steps S611 and S612 ECU 61 reads mode decision value ATSstate and retrieves a target main injection timing basic value MIT0 according to the operation mode from a map corresponding to mode decision value ATSstate. In this embodiment, when the recovery processing is executed, ECU 61 corrects target main injection timing basic value MIT0 retrieved from a normal map (standard) according to the target exhaust gas temperature, and sets the corrected value as a recovery mode target main injection timing basis value MIT0. Recovery mode target main injection basic value MIT0 is set at a timing retarded from a top dead center.

Figure 44:
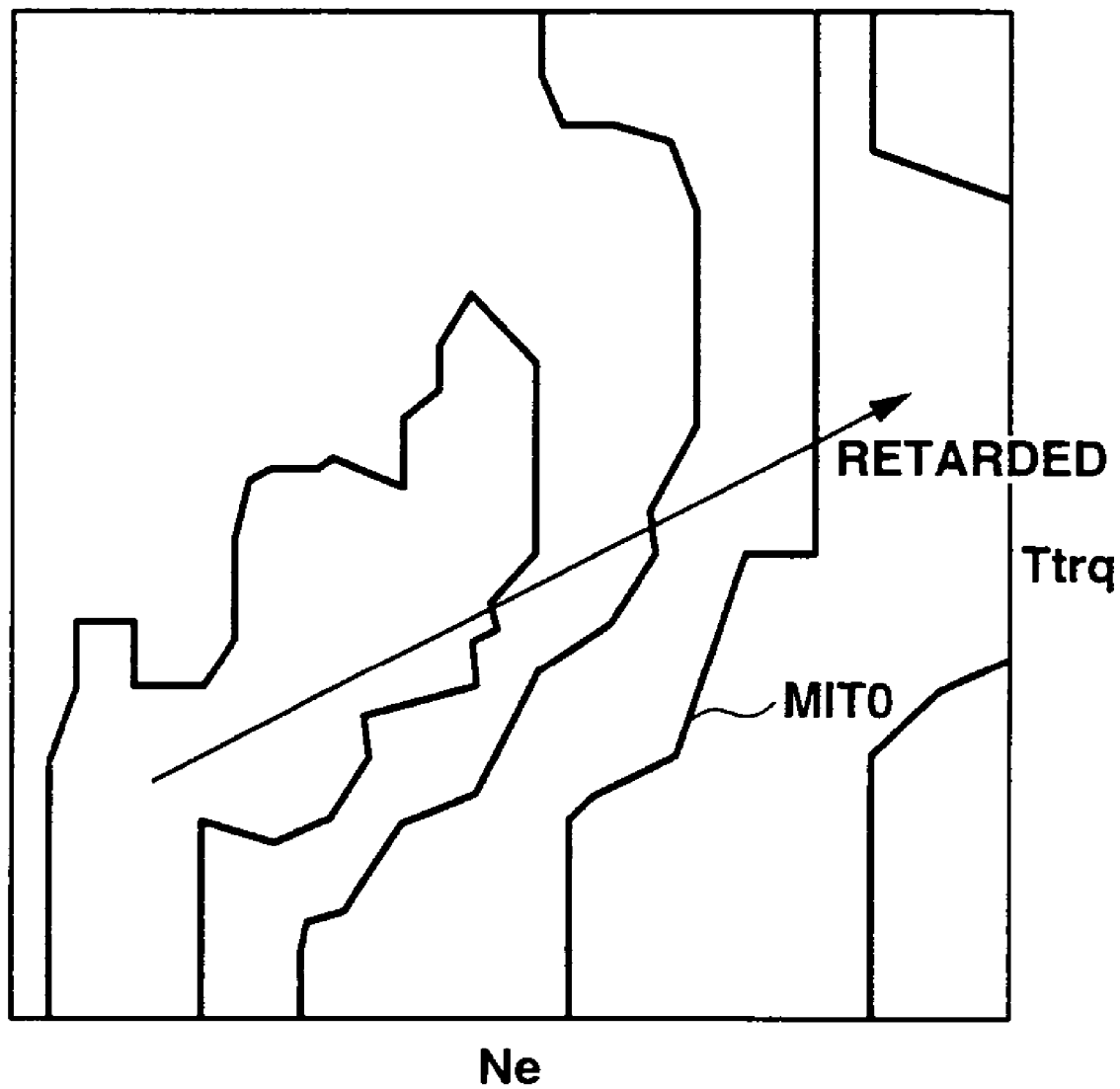
FIG. 44 is a map for obtaining a main injection timing basic value.

More specifically, when ATSstate=1, ECU 61 retrieves a normal mode target main injection timing MIT0 from a reference map shown in FIG. 44. When ATSstate=2, ECU 61 sets NOx recovery mode target main injection timing basic value MIT0 at a value obtained by retarding MIT0 of the reference mode by 10° (crank angle) (MIT0=MIT0+10° CA). When ATSstate=3, ECU 61 sets desulfurization mode target main injection timing basic value MIT0 at a value obtained by retarding MIT0 of the reference mode by 10° (crank angle) (MIT0=MIT0+10° CA). When ATSstate=4, ECU 61 sets filter recovery mode target main injection timing basic value MIT0 at a value obtained by retarding MIT0 of the reference mode by 10° (crank angle) (MIT0=MIT0+10° CA).

When ATSstate=3 or 4 and when one of desulfurization mode and filter recovery mode is executed, if exhaust gas resing mode is selected, ECU 61 sets exhaust gas rising mode target main injection timing basic value MIT0 at a value obtained by retarding MIT0 of the reference mode by 10° (crank angle) (MIT0=MIT0+10° CA). If malfunction avoiding mode is selected, ECU 61 sets exhaust gas rising mode target main injection timing basic value MIT0 at a value obtained by retarding MIT0 of the reference mode by 6° (crank angle) (MIT0=MIT0+6° CA).

At step S613 ECU 61 reads intake system response time constant Kkin and obtains a target main injection timing MIT by executing a delay processing of MIT0 using the following expression (28) which includes intake system response time constant Kkin.

$$MIT=MIT_{n-1}\times(1-Kkin)+MIT0\times Kkin \tag{28}$$

At step S614 ECU 61 sets main injection timing MITf by adding target main injection timing MIT and a main injection timing correction value MITfb (MITf=MIT+MITfb). When ATSstate=0, ECU 61 determines main injection timing MIT by executing a low temperature mode ignition timing control routine.

As discussed above, module M6 of ECU 61 rises the exhaust gas temperature by retarding the main injection timing and advances the pilot injection timing before the normal timing to suppress the generation of smoke and to reduce combustion noise. The pilot injection timing may be set in a manner as is similar to that of the main ignition timing. That is, a pilot injection timing basic value obtained from the normal mode map is advanced by a predetermined angle, and a delay processing of the obtained value is executed.

Figure 45:
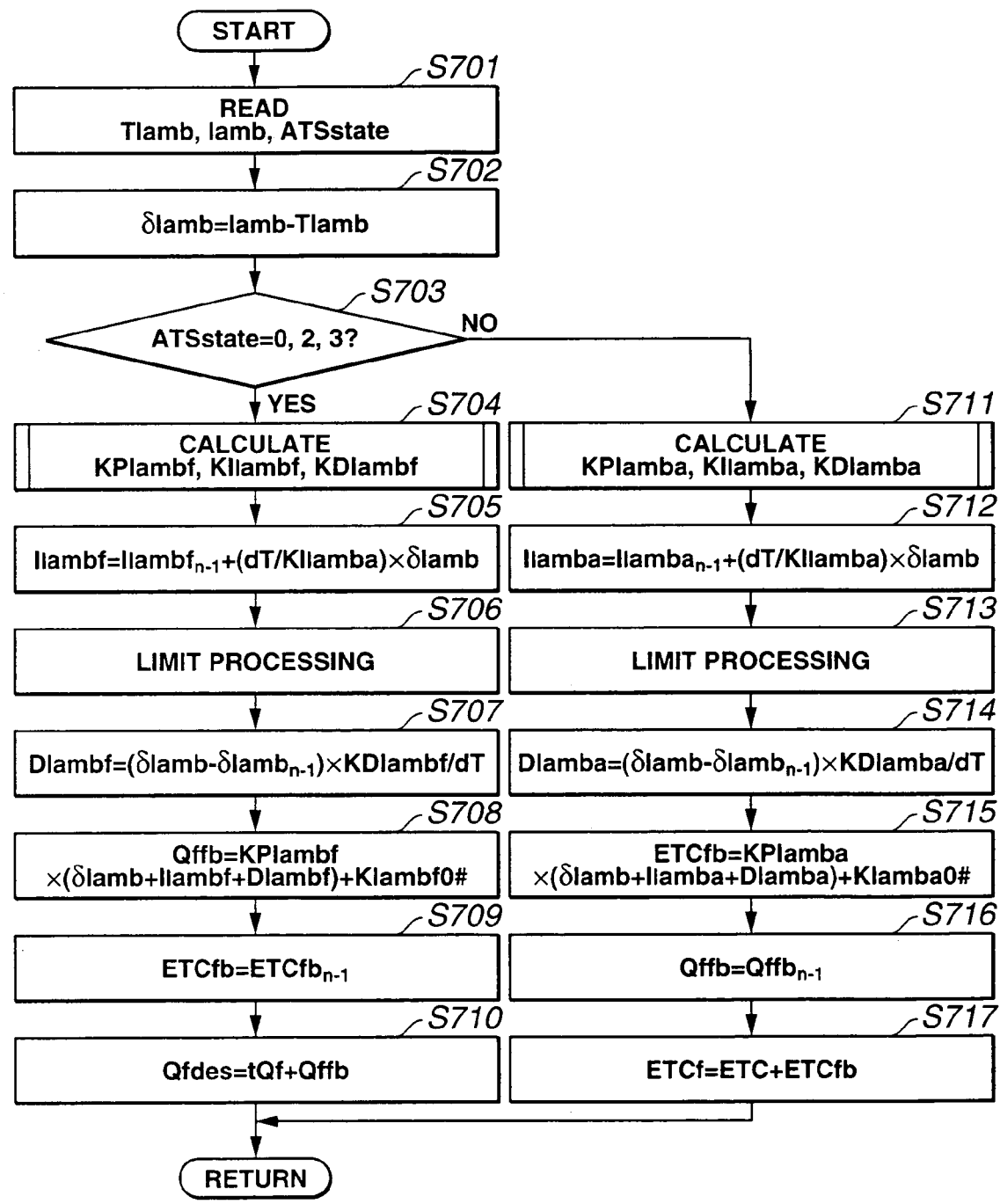
FIG. 45 is a flowchart of an air/fuel ratio feedback control routine.

There is discussed an air/fuel ratio feedback control. FIG. 45 shows a flowchart of an air/fuel ratio feedback control routine, which is executed by module M6 of ECU 61. Although the embodiment according to the present invention has been shown and described to employ a PID algorithm represented by the following expression (29) of a proportion plus integral plus derivative compensator, the other algorithm may be employed.

$$u(t) = KP\left\{e(t) + \frac{1}{KI}\int e(t)dt + KD\frac{de(t)}{dt}\right\} + u(t0) \tag{29}$$

where u(t) is a manipulated variable, KP is a proportion gain, KI is an integral time constant, KD is a derivative time constant, e(t) is a difference, and u(t0) is an initial value.

At step S701 ECU 61 reads target excess air ratio Tlamb, excess air ratio lamb, and mode decision value ATSstate. At step S702 ECU 61 calculates a disjunction (difference) dlamb between target excess air ratio Tlamb and excess air ratio lamb (dlamb=Tlamb−lamb).

At step S703 ECU 61 determines whether or not ATSstate=0, 2 or 3. When the determination at step S703 is affirmative, the routine proceeds to step S704. When the determination at step S703 is negative, the routine proceeds to step S711.

Figure 46A:
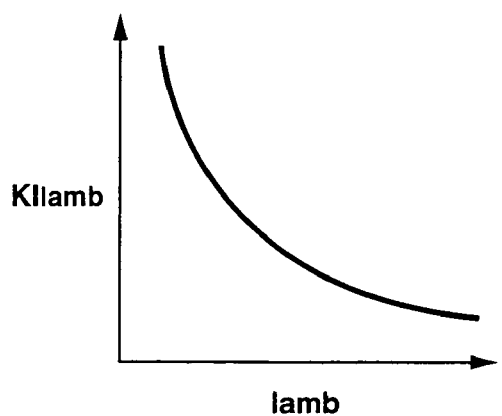
FIGS. 46A, 46B and 46C are tables for obtaining compensation gains.
Figure 46B:
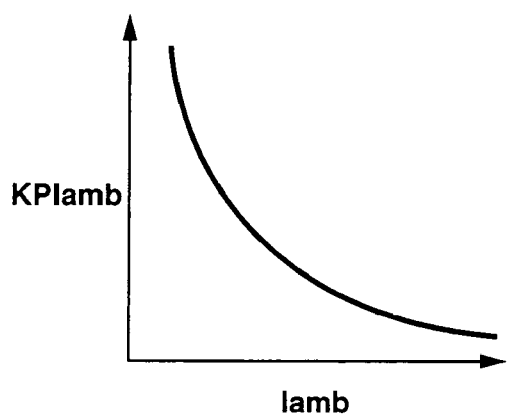
Figure 46C:
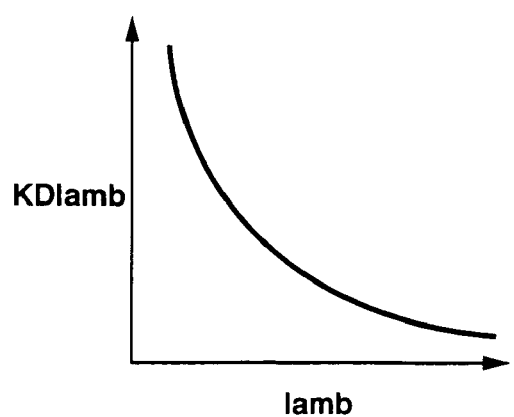

At each of steps S704 and S711, ECU 61 sets compensation gains KPlamb, KIlamb and KDlamb from tables shown in FIGS. 46A, 46B and 46C, respectively, on the basis of excess air ratio lamb. At each of steps S705 and S712, ECU 61 calculates an integral correction value Ilamb using the following expression (30).

$$Ilamb=Ilamb_{n-1}+(dT/KIlamb)\times\delta\,lamb \tag{30}$$

At each of steps S706 and S713, ECU 61 limits a magnitude of integral correction value Ilamb within a predetermined range. At each of steps S707 and S714, ECU 61 calculates a derivative correction value Dlamb using the following expression (31).

$$Dlamb=(\delta\,lamb-\delta\,lamb_{n-1})\times Dlamb/dT \tag{31}$$

At each of steps S708 and S715, ECU 61 calculates a PID correction quantity Qffb, ETCfb (which includes a proportional term) from each of the following expressions (32A) and (32B).

$$Qffb=KPlmabf\times(\delta\,lamb+Ilambf+Dlambf)+Klambf0\# \tag{32A}$$

$$ETCfbb=KPlmaba\times(\delta\,lamb+Ilamba+Dlamba)+Klamba0\# \tag{32B}$$

where Klambf0# and Klambd0# are initial values of the respective correction values.

At step S709 ECU 61 substitutes ETCfb$_{n-1}$ obtained in the previous routine in ETCfb (ETCfb=ETCfb$_{n-1}$). At step S710 ECU 61 calculates a final fuel injection quantity Qfdes by adding Qffb to target fuel injection quantity tQf (Qfdes=Qffb+tQf).

On the other hand, at step S716 ECU 61 substitutes Qffb$_{n-1}$ obtained in the previous routine in Qffb (Qffb=Qffb$_{n-1}$). At step S717 ECU 61 calculates a final intake throttle value opening ETCf by adding ETCb to intake throttle valve opening ETC (ETCf=ETC+ETCfb).

Figure 47:
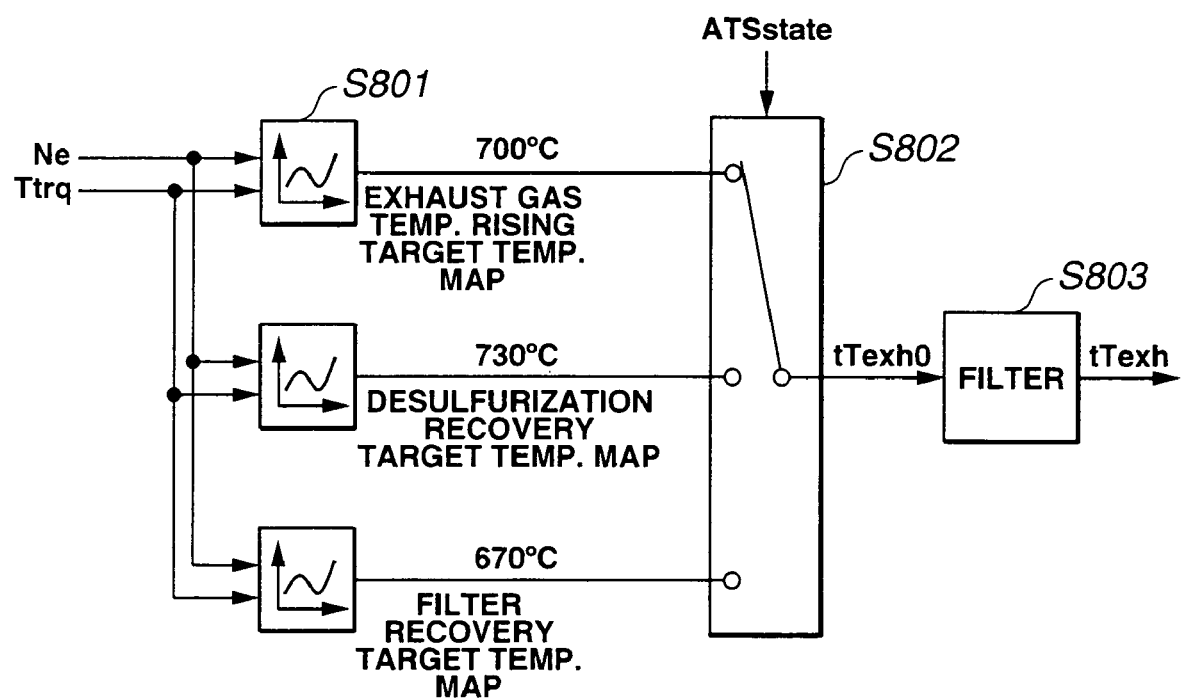
FIG. 47 is a flowchart of a target exhaust gas temperature calculation routine.

There is discussed a calculation of a target exhaust gas temperature. FIG. 47 is a flowchart of a target exhaust gas temperature calculation routine, which is executed by module M8 of ECU 61.

At steps S801 and S802 ECU 61 reads mode decision value ATSstate, selects a map corresponding to mode decision value ATSstate, and calculates a target exhaust gas temperature basic value tTexh0 according to the selected map. That is, when ATSstate=3, ECU 61 sets a desulfurization mode target exhaust gas temperature basic value tTexh0 at 730° C. When ATSstate=4, ECU 61 sets a filter recovery mode target exhaust gas temperature basic value tTexh0 at 670° C. Further, when an exhaust gas rising mode is selected, ECU 61 sets an exhaust gas rising mode target exhaust gas temperature basic value tTexh0 at 700° C.

At step S803 ECU 61 determines a target exhaust gas temperature tTexh by executing a delay processing of basic value tTexh0 using the following expression (33) which includes intake system response time constant Kkin.

$$tTexh=tTexh_{n-1}\times(1-Kkin)+tTexh0\times Kkin \tag{33}$$

Figure 48:
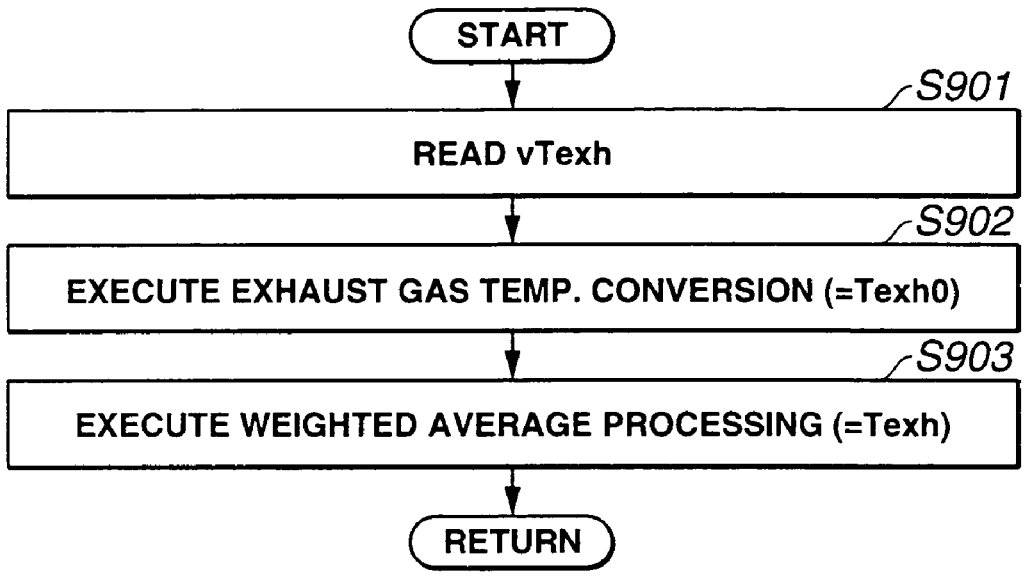
FIG. 48 is a flowchart of an exhaust gas temperature calculation routine.

There is discussed a calculation of the exhaust gas temperature. FIG. 48 is a flowchart of the exhaust gas temperature calculation routine, which is executed by module M8 of ECU 61.

Figure 49:
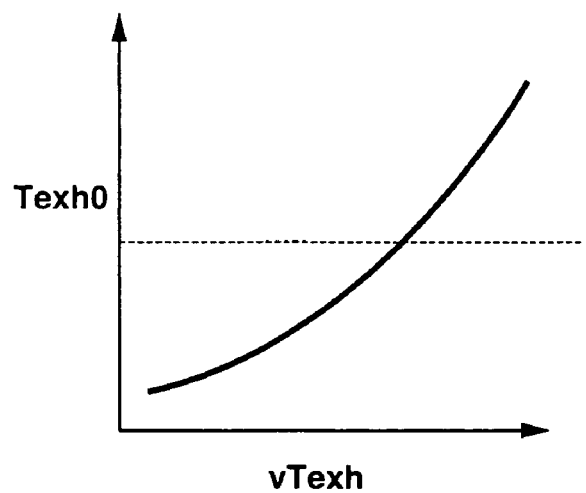
FIG. 49 is a conversion table between a voltage and a temperature as to the exhaust gas temperature.

At step S901 ECU 61 calculates an output vTexh of sensor 73. At step S902 ECU 61 obtains exhaust gas temperature Texh0 by converting vTexh using a table shown in FIG. 49. At step S903 ECU 61 executes a weighted average processing of exhaust gas temperature Texh0 and sets the obtained value as exhaust gas temperature Texh.

Figure 50:
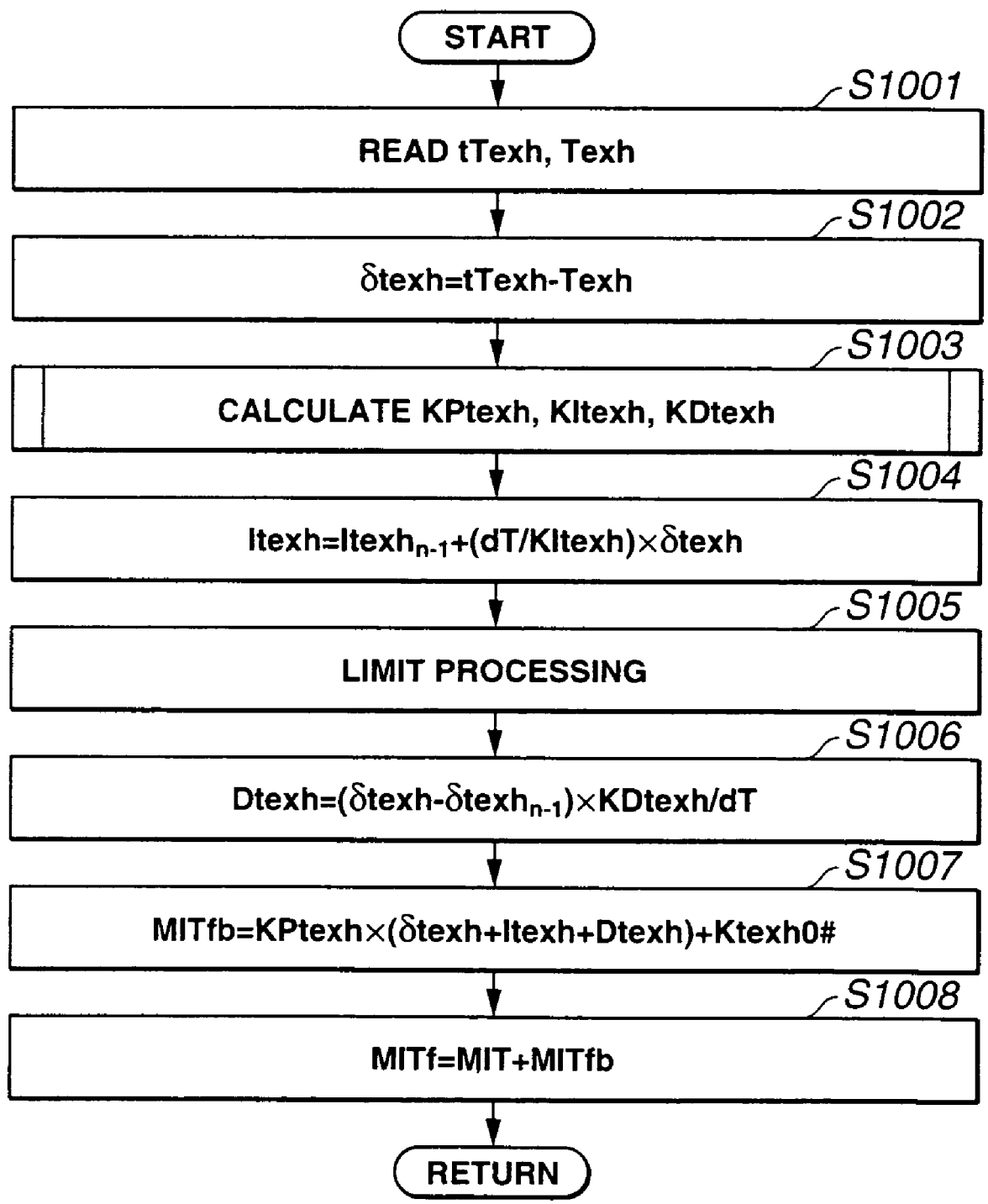
FIG. 50 is a flowchart of an exhaust gas temperature feedback control routine.

There is discussed a feedback control of the exhaust gas temperature. FIG. 50 is a flowchart of the feedback control routine of the exhaust gas temperature, which is executed by module M9 of ECU 61.

Although the embodiment according to the present invention has been shown and described to employ a PID algorithm represented by the following expression (34) of a proportion plus integral plus derivative compensator, the other algorithm may be employed.

$$u(t) = KP\left\{e(t) + \frac{1}{KI}\int e(t)dt + KD\frac{de(t)}{dt}\right\} + u(t0) \tag{34}$$

where u(t) is a manipulated variable, KP is a proportion gain, KI is an integral time constant, KD is a derivative time constant, e(t) is a difference, and u(t0) is an initial value.

Figure 51A:
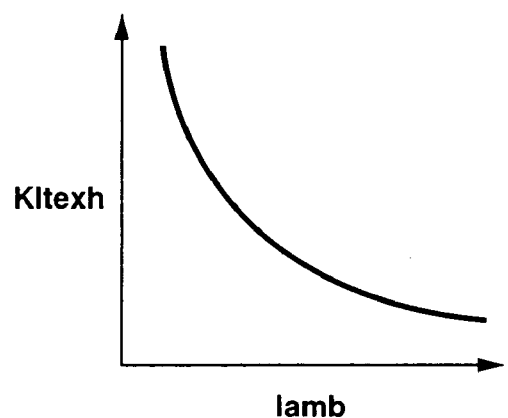
FIGS. 51A, 51B and 51C are tables for obtaining compensation gains.
Figure 51B:
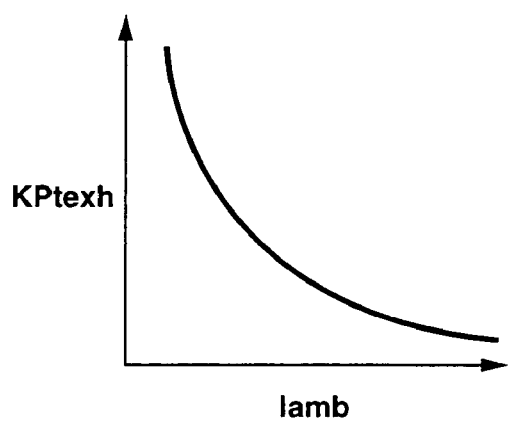
Figure 51C:
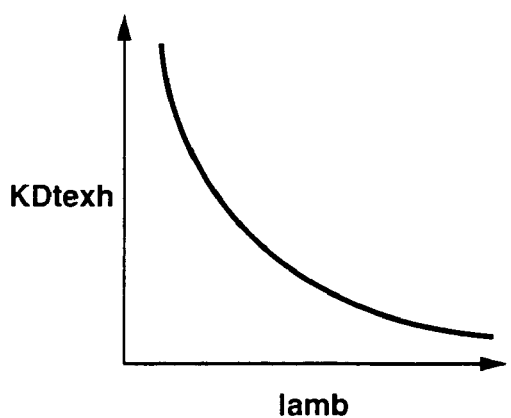

At step S1001 ECU 61 reads target exhaust gas temperature tTexh and exhaust gas temperature Texh. At step S1002 ECU 61 calculates a disjunction (difference) dTexh between target exhaust gas temperature tTexh and exhaust gas temperature Texh (dTexh=tTexh−Texh). At step S1003, ECU 61 determines proportion, integral and derivative compensation gains KPlamb, KIlamb and KDlamb from tables shown in FIGS. 51A, 51B and 51C, respectively, on the basis of excess air ratio lamb. At step S1004, ECU 61 calculates an integral correction value Itexh using the following expression (35).

$$Itexh = Itexhn-1 + (dT/KItexh) \times \delta\ texh \tag{35}$$

At step S1005, ECU 61 limits a magnitude of integral correction value Itexh within a predetermined range. At step S1006, ECU 61 calculates a derivative correction value Dtexh using the following expression (36).

$$Dtexh = (\delta\ texh - \delta\ texh_{n-1}) \times KDtexh/dT \tag{36}$$

At step S1007, ECU 61 calculates a PID correction quantity MITfb (which includes a proportional term) from the following expression (37).

$$MITfb = KPtexh \times (\delta\ texh - Itexh + Dtexh) + Ktexh0\# \tag{37}$$

where Ktexh0# is an initial value of the correction value. At step S1008, a final main injection timing MITf is obtained by assing MITfb to main injection timing MIT (MITf=MIT+MITfb.)

With the thus arranged embodiment according to the present invention, it becomes possible to derive the following advantages.

During the desulfurization processing of NOx trap catalyst 32 and the filter recovery processing of diesel particulate filter 33, exhaust gas temperature Texh is risen to target temperature tTexh which is higher than the normal mode temperature, and air excess air ratio lamb is maintained at target excess air ratio tlamb according to the selected recovery mode. Therefore, even if the engine operating condition is changed due to the vehicle acceleration or if a traveling circumstance of the vehicle is changed, the system according to the present invention prevents excess air ratio lamb from changing according to these changes. This prevents the deterioration of NOx trap catalyst 32 and the generation of malfunction such that an element of diesel particulate filter 33 is cracked.

Figure 52A:
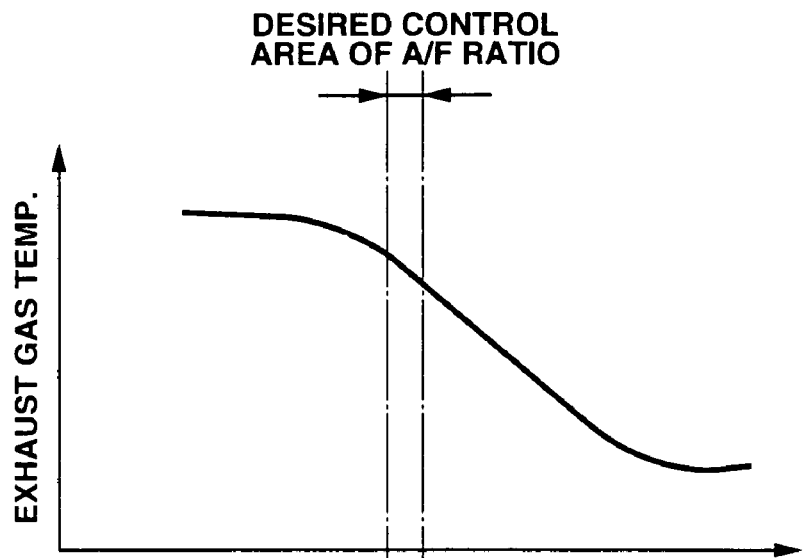
FIGS. 52A, 52B and 52C are graphs showing a relationship of the exhaust gas temperature, a CO discharge quantity and a HC discharge quantity relative to the air/fuel ratio a flowchart of a target exhaust gas temperature calculation routine.
Figure 52B:
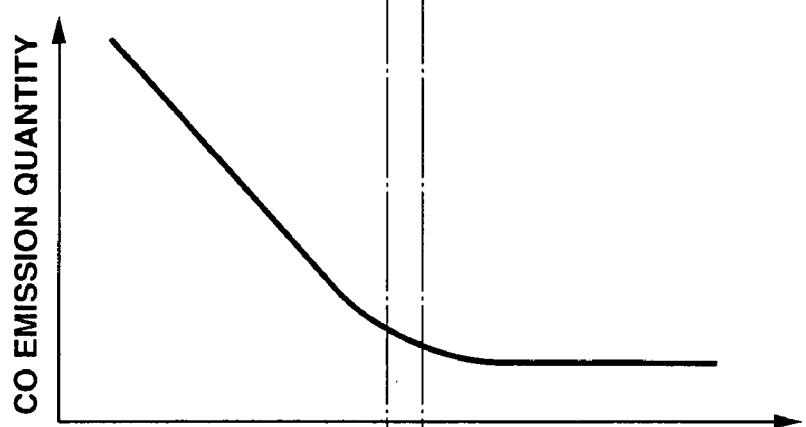
Figure 52C:
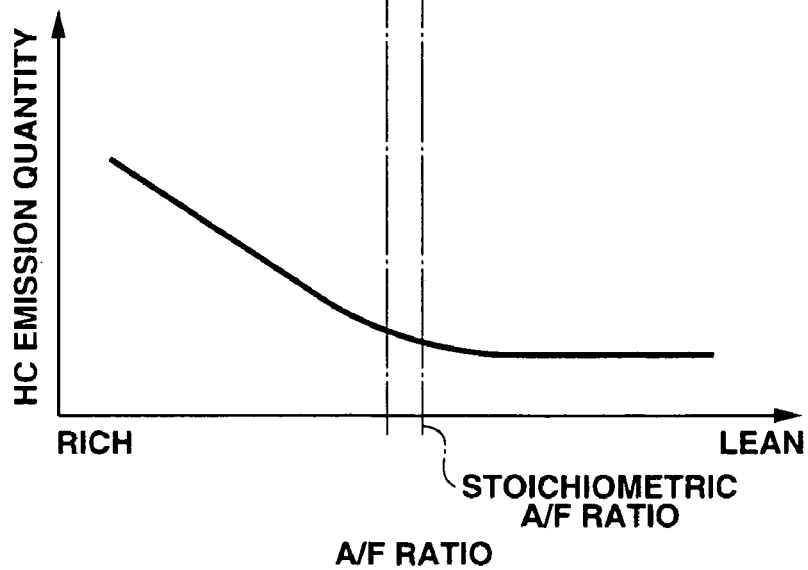

FIGS. 52A through 52C respectively show a relationship between the air/fuel ratio and the exhaust gas temperature, a relationship between the air/fuel ratio and the CO discharge quantity, and a relationship between the air/fuel ratio and the HC discharge quantity. The CO discharge quantity and the HC discharge quantity are the quantity of carbon monoxide and the quantity of hydrocarbon which are discharged form engine 1 per unit time. During the desulfurization processing, the air/fuel ratio is set at the stoichiometric air/fuel ratio or rich state to decompose sulfur content trapped in NOx trap catalyst 32. Exhaust gas temperature has a characteristic that the exhaust gas temperature rises as the air/fuel ratio is decreased. Accordingly, when the air/fuel ratio becomes out of the target range due to the change of the engine operating condition, the exhaust gas temperature excessively rises, and therefore an excessive heat load may be applied to NOx trap catalyst 32.

Further, when the air/fuel is set at a stoichiometric air/fuel ratio or rich state, the CO discharge quantity and the HC discharge quantity become increased. Therefore, under this control state, if the air/fuel ratio is largely increased to a value outside of a target range, a reduction agent such as carbon monoxide radically reacts in the catalyst, and therefore, an excessive heat load may be applied to NOx trap catalyst 32. Generally, NOx trap catalyst 32 has a limitation in heat resistance, and it is difficult to improve this limitation.

Figure 53:
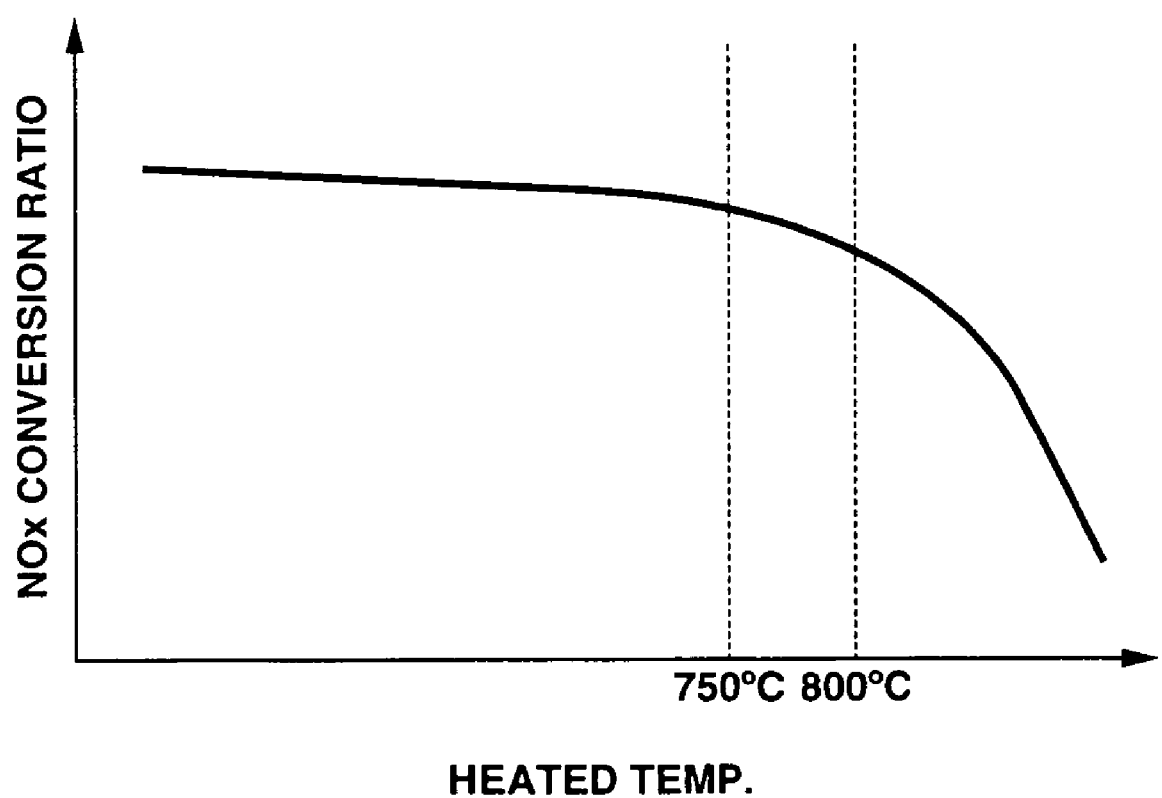
FIG. 53 is a graph showing a relationship between a heated temperature of a NOx trap catalyst and a NOx conversion ratio.

FIG. 53 shows a relationship between a heated temperature of NOx trap catalyst 32 and a NOx conversion ratio of the NOx trap catalyst 32 which has been put in the heated temperature. As is apparent from FIG. 53, if NOx trap catalyst 32 once receives an excessive heat load, the performance of the catalyst is largely deteriorated.

According to the present invention, during the desulfurization recovery mode, even if the engine operating condition is varied, excess air ratio lamb is maintained constant. Therefore, it becomes possible to prevent NOx trap catalyst 32 from receiving excessive heat load and thereby preventing the deterioration of the performance of NOx trap catalyst 32. Further, it is preferable that the desulfurization recovery mode target exhaust gas temperature is set at a value lower than or equal to 750° C., and the upper limit thereof is around 800° C.

Figures 54A, 54B:
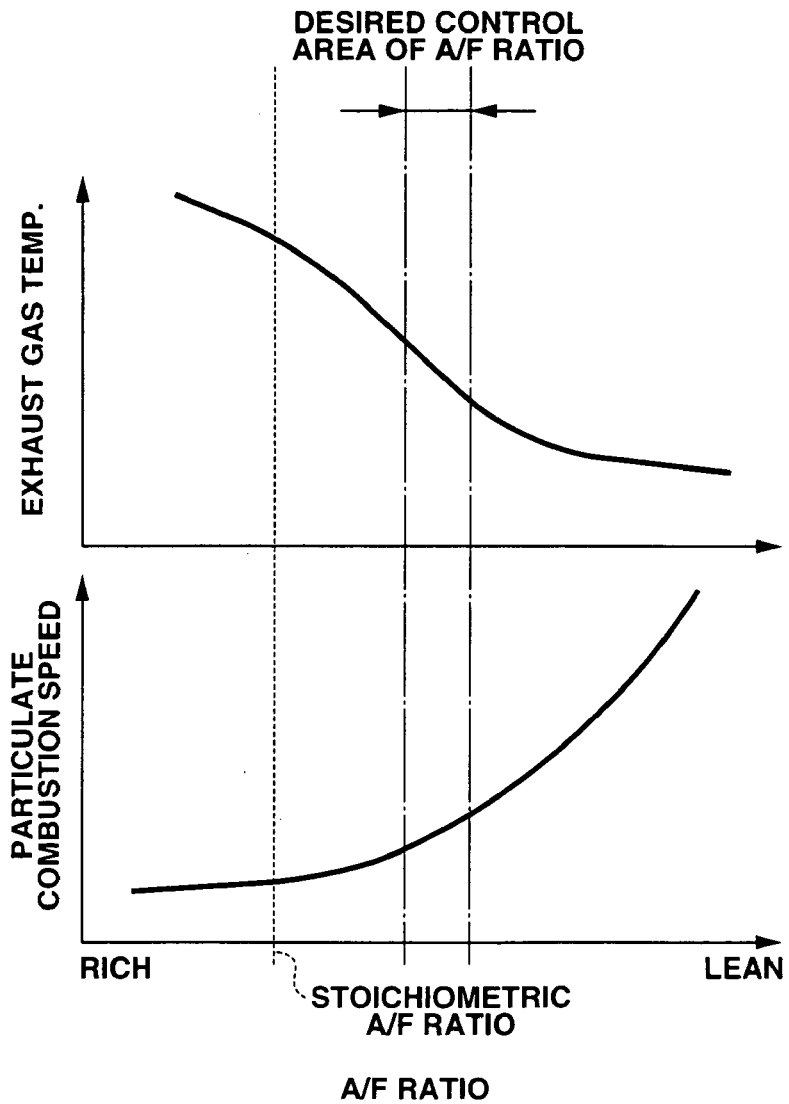
FIGS. 54A and 54B is graphs showing relationships of the exhaust gas temperature and a particulate combustion speed relative to the air/fuel ratio.
Figure 55A:
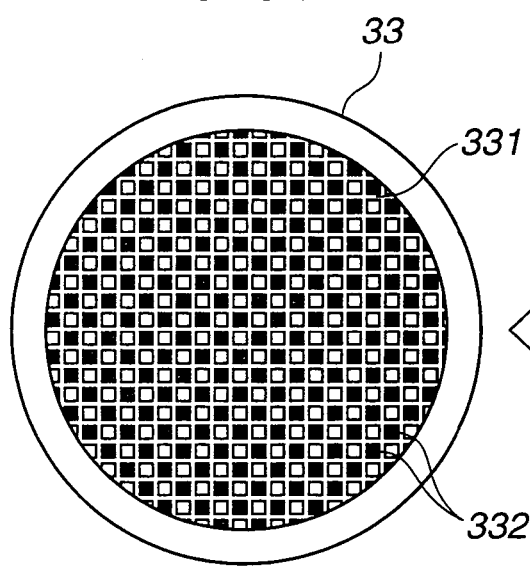
FIGS. 55A, 55B and 55C are views for explaining a malfunction of a diesel particulate filter.
Figure 55B:
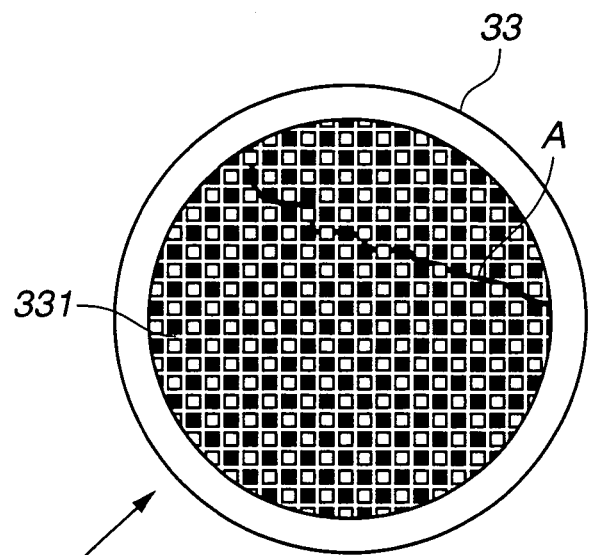
Figure 55C:
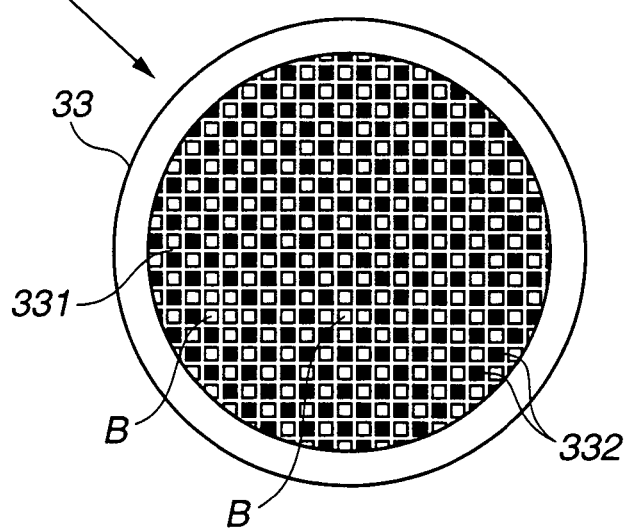

FIGS. 54A and 54B show relationships of the exhaust gas temperature and a particulate combustion speed relative to the air/fuel ratio. The particulate combustion speed is a decreased quantity per unit time of particulates deposited on diesel particulate filter 33. During the filter recovery processing, excess air ratio lamb is set at a lean state so as to suitably suppress the combustion of particulates. The particulate combustion speed largely varies according to the change of the air/fuel ratio and has a characteristic that the particulate combustion speed largely increases as the air/fuel ratio is increased. On the other hand, when the air/fuel ratio is decreased to a value outside of the target range due to the change of the engine operating condition, there is a possibility that excessive heat load is applied to diesel particulate filter 33 and therefore a filter element 331 generates a crack A as shown in FIG. 55B or loses stoppers 332 as shown by reference B in FIG. 55C. If the increased quantity of the fuel injection quantity is further large, there is a possibility that discharged fuel cools diesel particulate filter 33 and prevents the recovery operation. However, according to the present invention, during the filter recovery mode, excess air ratio lamb is maintained constant, and this prevents diesel particulate filter 33 from receiving excessive heat load and the recovery thereof from being prevented by such a cooling due to the excessive fuel increase.

This application is based on Japanese Patent Application No. 2003-114717 filed on, Apr. 18, 2003 in Japan. The entire contents of this Japanese Patent Application are incorporated herein by reference.

Although the invention has been described above by reference to certain embodiments of the invention, the invention is not limited to the embodiments described above. Modifications and variations of the embodiments described above will occur to those skilled in the art, in light of the above teaching. The scope of the invention is defined with reference to the following claims.

What is claimed is:

1. An exhaust gas purifying system for an internal combustion engine, comprising:
   an exhaust gas purifying device disposed in an exhaust passage of the engine to remove specific content from exhaust gas; and
   a control unit arranged:
      to determine a recovery execution timing of executing recovery processing for recovering the exhaust gas purifying device from a specific content stacked state;
      to determine a target air/fuel ratio for executing the recovery processing;

to determine a first engine controlled variable relating to an air/fuel ratio on the basis of the target air/fuel ratio; and to determine a second engine controlled variable relating to a combustion period, at a value different from a value employed during normal processing, when the recovery processing is executed, wherein the second engine controlled variable includes one of a main injection timing, a pilot injection quantity and a pilot injection timing.

2. The exhaust gas purifying system as claimed in claim 1, wherein the control unit is further arranged to increase a temperature of the exhaust gas so as to be higher than a temperature during the normal processing by changing the second engine controlled variable.

3. The exhaust gas purifying system as claimed in claim 2, wherein the main injection timing is retarded after a top dead center, and the pilot injection timing is advanced.

4. The exhaust gas purifying system as claimed in claim 1, further comprising an exhaust gas temperature sensor for detecting an exhaust gas temperature of the exhaust gas, the control unit being further arranged to determine a unusual basic value for the second engine controlled variable and to determine the second engine controlled variable by correcting the unusual basic value on the basis of the exhaust gas temperature.

5. The exhaust gas purifying system as claimed in claim 1, wherein the target air/fuel ratio for the recovery processing is richer than the target air/fuel ratio for the normal processing.

6. The exhaust gas purifying system as claimed in claim 1, wherein the exhaust gas purifying device includes a particulate filter which removes particulates in the exhaust gas.

7. The exhaust gas purifying system as claimed in claim 1, wherein the exhaust gas purifying device includes a NOx trap catalyst for trapping NOx in the exhaust gas and discharging the trapped NOx according to the air/fuel ratio.

8. The exhaust gas purifying system as claimed in claim 1, further comprising an air/fuel ratio detector for detecting an air/fuel ratio, the control unit being further arranged to determine a basic value of the first engine controlled variable according to the target air/fuel ratio and to determine the first engine controlled variable by correcting the basic value on the basis of the detected air/fuel ratio.

9. The exhaust gas purifying system as claimed in claim 8, wherein the control unit is further arranged to determine the first engine controlled variable by correcting the basic value on the basis of the detected air/fuel ratio when the target air/fuel ratio is richer than or equal to a stoichiometric air/fuel ratio, and to change a fuel injection quantity according to the first engine controlled variable.

10. The exhaust gas purifying system as claimed in claim 8, wherein the control unit is further arranged to determine the first engine controlled variable by correcting the basic value on the basis of the detected air/fuel ratio, and to change an intake air quantity according to the first engine controlled variable.

11. The exhaust gas purifying system as claimed in claim 1, wherein the control unit is further arranged to correct the first engine controlled variable on the basis of the second engine controlled variable.

12. An exhaust gas purifying system for an internal combustion engine, comprising:

an exhaust gas purifying device disposed in an exhaust passage of the engine to remove specific content from exhaust gas; and a control unit arranged:

to determine whether recovery processing for recovering the exhaust gas purifying device as to accumulated specific contents in the exhaust gas purifying device is executed; and to increase an exhaust gas temperature at a temperature higher than an exhaust gas temperature during a normal control, by setting an air/fuel ratio at a target air/fuel ratio and by controlling a combustion period while maintaining the air/fuel ratio at the target air/fuel ratio when the recovery processing is executed, wherein the controlling the combustion period comprises setting an engine controlled variable relating to the combustion period, and the engine controlled variable includes one of a main injection timing, a pilot injection quantity and a pilot injection timing.

13. A method of executing recovery processing of an exhaust gas purifying device disposed in an exhaust passage of an internal combustion engine, comprising:

determining a recovery execution timing for recovery processing of recovering the exhaust gas purifying device from a specific content stacked state;

setting a target air/fuel ratio for executing the recovery processing;

setting a first engine controlled variable relating to an air/fuel ratio on the basis of the target air/fuel ratio; and setting a second engine controlled variable relating to a combustion period, at a value different from a value employed during normal processing, when the recovery processing is executed, wherein the second engine controlled variable includes one of a main injection timing, a pilot injection quantity and a pilot injection timing.

14. An exhaust gas purifying system for an internal combustion engine, comprising:

exhaust gas purifying means for removing specific content from exhaust gas, the exhaust gas purifying means being disposed in an exhaust passage of the engine;

recovery timing determining means for determining a recovery execution timing for recovery processing of recovering the exhaust gas purifying device from a specific content stacked state;

recovery mode target air/fuel ratio setting means for setting a target air/fuel ratio for executing a recovery of the exhaust gas purifying device;

first engine controlled variable setting means for setting a first engine controlled variable relating to an air/fuel ratio on the basis of the target air/fuel ratio; and second engine controlled variable setting means for setting a second engine controlled variable relating to a combustion period, at a value different from a value employed during normal processing, when the recovery processing is executed, the second engine controlled variable including at least one of a main injection timing, a pilot injection Quantity and a pilot injection timing.

* * * * *